US011915557B2

(12) United States Patent
Emori

(10) Patent No.: US 11,915,557 B2
(45) Date of Patent: Feb. 27, 2024

(54) INFORMATION PROCESSING APPARATUS

(71) Applicant: Universal Entertainment Corporation, Tokyo (JP)

(72) Inventor: Kazuki Emori, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 260 days.

(21) Appl. No.: 16/190,269

(22) Filed: Nov. 14, 2018

(65) Prior Publication Data

US 2019/0156627 A1 May 23, 2019

(30) Foreign Application Priority Data

Nov. 22, 2017 (JP) ................................ 2017-225178

(51) Int. Cl.
*G07F 17/32* (2006.01)

(52) U.S. Cl.
CPC ...... *G07F 17/3246* (2013.01); *G07F 17/3244* (2013.01)

(58) Field of Classification Search
CPC ............. G07F 17/3246; G07F 17/3244; G07F 17/3209; G07F 17/3216
USPC ........................................................... 463/25
See application file for complete search history.

(56) References Cited

U.S. PATENT DOCUMENTS 10,885,742 B2 * 1/2021 Emori ................. G07F 17/3246
10,949,839 B2 * 3/2021 Emori .................... G06Q 50/34
11,227,467 B2 * 1/2022 Emori ................. G07F 17/3227
2002/0151366 A1 * 10/2002 Walker .................... G07F 17/32 463/42
2005/0239540 A1 * 10/2005 Inamura .................. G07F 17/34 463/20
2008/0058065 A1 * 3/2008 Okada ..................... G07F 17/32 463/20
2008/0146313 A1 * 6/2008 Inamura .................. G07F 17/32 463/31
2008/0311979 A1 * 12/2008 Walker .................... G07F 17/32 463/20
2009/0054149 A1 * 2/2009 Brosnan .................. G07F 17/32 463/42
2009/0215514 A1 * 8/2009 Okada ................. G07F 17/3209 463/17
2010/0227690 A1 * 9/2010 Brunet De Courssou .................. G07F 17/3211 463/46
2012/0071223 A1 * 3/2012 Sharkov .............. G07F 17/3288 463/20
2012/0252556 A1 * 10/2012 Doyle ................. G07F 17/3246 463/25

(Continued)

*Primary Examiner* — Milap Shah
(74) *Attorney, Agent, or Firm* — LEX IP MEISTER, PLLC

(57) ABSTRACT

The object of the present invention is to provide an information processing apparatus that enables a user to more easily understand a displayed amount. The information processing apparatus is provided with: multiple types of paper stock having currency information that include a currency unit; an insertion slot into which the multiple types of paper stock are inserted; a reading device for reading the multiple types of paper stock inserted into the insertion slot; and a display device for displaying a currency amount, being equivalent of one credit of a credit amount necessary for starting a process, with the currency unit, based on currency information corresponding to each of the multiple types of paper stock read by the reading device.

17 Claims, 10 Drawing Sheets

(56) References Cited

U.S. PATENT DOCUMENTS

2015/0221176 A1* 8/2015 Meyer ..................... G07F 17/34
463/20

* cited by examiner

FIG.6A

753

| INSERTED CURRENCY UNIT | Dollars |
|---|---|
| EXCHANGE RATE | 1 peso = 0.01 dollars |

FIG.6B

BET AMOUNT TABLE (CREDITS (pesos))

| | 3WAYS | 9WAYS | 27WAYS | 81WAYS | 243WAYS |
|---|---|---|---|---|---|
| 1—BET | 1(1peso) | 3(3pesos) | 7(7pesos) | 15(15pesos) | 25(25pesos) |
| 2—BET | 2(2pesos) | 6(6pesos) | 14(14pesos) | 30(30pesos) | 50(50pesos) |
| 3—BET | 3(3pesos) | 9(9pesos) | 21(21pesos) | 45(45pesos) | 75(75pesos) |
| 5—BET | 5(5pesos) | 15(15pesos) | 35(35pesos) | 75(75pesos) | 125(125pesos) |
| 10—BET | 10(10pesos) | 30(30pesos) | 70(70pesos) | 150(150pesos) | 250(250pesos) |

FIG.6C

BET AMOUNT TABLE (CREDITS (dollars))

| | 3WAYS | 9WAYS | 27WAYS | 81WAYS | 243WAYS |
|---|---|---|---|---|---|
| 1—BET | 1 (0.01 dollars) | 3 (0.03 dollars) | 7 (0.07 dollars) | 15 (0.15 dollars) | 25 (0.25 dollars) |
| 2—BET | 2 (0.02 dollars) | 6 (0.06 dollars) | 14 (0.14 dollars) | 30 (0.30 dollars) | 50 (0.50 dollars) |
| 3—BET | 3 (0.03dollars) | 9 (0.09 dollars) | 21 (0.21 dollars) | 45 (0.45 dollars) | 75 (0.75 dollars) |
| 5—BET | 5 (0.05 dollars) | 15 (0.15 dollars) | 35 (0.35 dollars) | 75 (0.75 dollars) | 125 (1.25 dollars) |
| 10—BET | 10 (0.10 dollars) | 30 (0.30 dollars) | 70 (0.70 dollars) | 150 (1.50 dollars) | 250 (2.50 dollars) |

INFORMATION PROCESSING APPARATUS

CROSS-REFERENCE TO RELATED APPLICATION

This application claims the benefit of Japanese Patent Application No. 2017-225178, filed on Nov. 22, 2017, which application is incorporated herein by reference in its entirety.

TECHNICAL FIELD

The present invention relates to an information processing apparatus capable of inserting multiple currency types.

BACKGROUND OF INVENTION

A gaming machine in which a symbol array is scrolled and displayed on a display, and a plurality of symbols are rearranged in a symbol display area, on which a plurality of paylines are set, has been known (for example, Patent Document 1). In such a gaming machine, a player operates a control panel, on which a plurality of buttons are arranged, to decide on bet information for one game.

PATENT LITERATURE

[Patent Document 1] U.S. Patent Application Publication No. 2005/0239540

BRIEF SUMMARY OF THE INVENTION

When a game is played on the above-mentioned gaming machine, as a result of the player inserting cash into a bill identification device provided on the gaming machine, credit data, for playing the game according to the amount of cash inserted, is acquired and the bet information for playing the game one time are determined by using the credit data.

In such a gaming machine, receiving of bets or awarding of prizes is performed based on credit data converted from a predetermined currency unit (e.g., a currency unit such as "pesos"), and when a monetary amount corresponding to the credit amount is displayed, the monetary amount is displayed in the predetermined currency unit.

In this way, in addition to the player preparing cash in a specified currency unit that can be handled by the gaming machine and playing the game by inserting the cash, the amount in the specified currency unit is displayed as the credit amount necessary for the game to progress in the gaming machine. However, it is difficult for the player to understand the displayed monetary amount if the monetary amount is in a currency unit that is different (e.g., "pesos") from a currency unit the player is accustomed to using (e.g., "dollars" for an American).

The present invention has been made in consideration of the above-mentioned points, and an object thereof is to provide an information processing apparatus which enables a user to more easily understand the displayed amount.

The information processing apparatus of the present invention is provided with multiple types of paper stock having currency information that includes a currency unit, an insertion slot into which the multiple types of paper stock are inserted, a reading device for reading the multiple types of paper stock inserted into the insertion slot, and a display device for displaying a currency amount, being equivalent of one credit of a credit amount necessary for starting a process, with the currency unit based on the currency information corresponding to each of the multiple types of paper stock read by the reading device.

With this configuration, the currency amount per credit of the credit amount necessary for starting the process is displayed based on the currency information read by the reading device so that the user can see the display of the currency amount corresponding to the currency information of the inserted paper stock and can more easily understand the displayed amount.

Further, the information processing apparatus of the present invention in the above configuration has an input device for inputting the credit amount, and a control device for converting the currency amount corresponding to the credit amount inputted by the input device into a specified currency amount including a specified currency unit, wherein the control device moves the process forward using the specified currency amount.

With this configuration, by inputting the currency amount corresponding to the credit amount based on the currency information of the inserted paper stock together with converting the inputted currency amount to a specified currency amount and performing the process, the control device can input the credit amount to the display based on the currency information of the inserted paper stock without changing the configuration in which the control device performs the process based on the specified currency amount.

Further, the information processing apparatus of the present invention in the above configuration has a changing device capable of changing the currency amount per credit, wherein the control device performs conversion to specified currency information based on the currency amount changed by the changing device.

With this configuration, the currency amount per credit can be changed making it possible for the user to easily input a large variety of credit amounts.

The present invention provides an information processing apparatus capable of making it easier for a user to understand a display amount.

BRIEF DESCRIPTION OF THE DRAWINGS

The nature and mode of operation of the present invention will now be more fully described in the following detailed description of the invention taken with the accompanying drawing figures, in which:

FIG. 6A, FIG. 6B and FIG. 6C are schematic diagrams showing a storage state of an exchange rate and a bet amount table.

DETAILED DESCRIPTION OF THE PREFERRED EMBODIMENT

A gaming machine will be described as an information processing apparatus of the present invention with reference to the drawings.

[Overall Structure of Slot Machine]

The overall structure of a slot machine 10 will be described.

In the slot machine 10, bills, coins, medals, tokens, bar-coded tickets, and the like are used as gaming value in addition to electronic value information such as cyber money.

Figure 1:
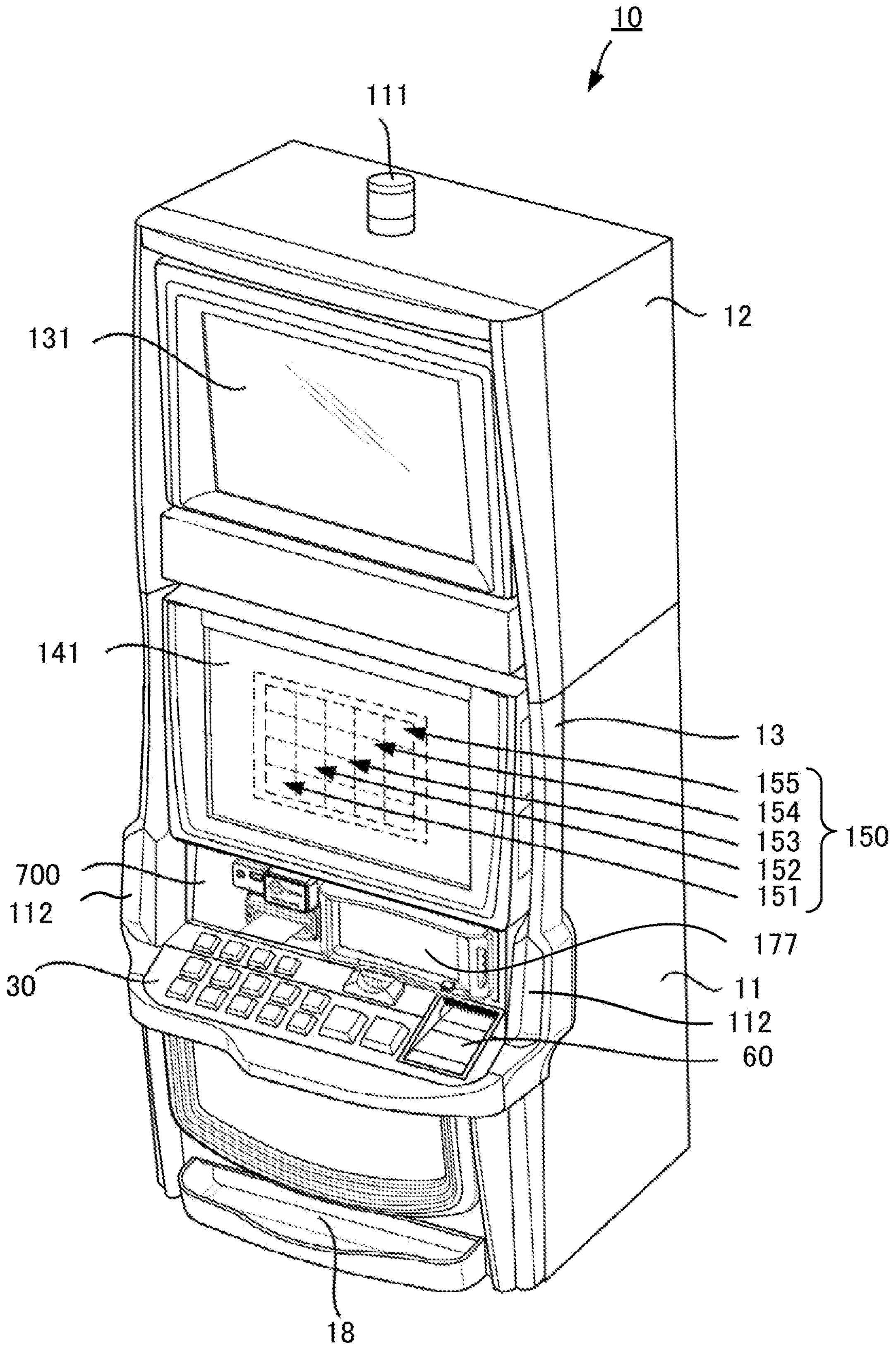
FIG. 1 is a perspective view showing an external appearance of a slot machine.

As shown in FIG. 1, a lower image display panel 141 is provided at the center of the front surface of a housing 11 of the slot machine 10. The lower image display panel 141 is a liquid crystal panel and constitutes a display. The lower image display panel 141 has a symbol display area 150 for displaying images of a plurality of video reels 151-155. A portion of a front panel 13 is provided with a lamp 112 used for effects rendering. Various indicating lamps 111 are provided above the slot machine 10.

In the present embodiment, a video reel is a reel that simulates the rotation and stop operations of a mechanical reel in which a plurality of symbols are drawn on its peripheral surface. A symbol array composed of a plurality of symbols is assigned to the video reel.

In the present embodiment, a video reel system for displaying a simulated reel is adopted, but the slot machine 10 may be a system with a reel unit of a mechanical reel system, or may be a system in which the video reel and the mechanical system are mixed.

An upper image display panel 131 is provided on the front of an upper housing 12 above the lower image display panel 141. The upper image display panel 131 is a liquid crystal panel and constitutes a display. The upper image display panel 131 displays images related to the effects rendering or images which introduce game contents or explain rules.

Below the lower image display panel 141, a control panel 30 on which various buttons are arranged, a PTS device 700 that functions as a conversion apparatus, and a bill entry 60 are provided.

The bill entry 60 identifies whether the bill is proper or not and accepts genuine bills into the slot machine 10. The bill entry 60 is electrically connected to the PTS device 700 and transmits an input signal based on the amount of the bill to the PTS device 700 upon receipt of a genuine bill. The input signal includes inserted currency information (e.g., “1 php”) including the currency unit of the inserted bill (Philippine pesos: php (hereinafter simply referred to as “pesos” or “php”), dollars: usd, yen: jpy, etc.) and the monetary amount in the currency unit.

In the present embodiment, in addition to the inserted currency information of the bill inserted into the bill entry 60, there is a concept of currency information (e.g., “1 php, 1 credit”). This currency information is a concept that includes a currency unit (“php (pesos),” “usd (dollars),” “jpy (yen),” etc.), the monetary amount in this currency unit (e.g., “1 php (peso),” etc.), and the credit amount corresponding to the monetary amount information (e.g., “1 php, 1 credit,” etc.).

In the slot machine 10 of the present embodiment, one credit, which is a unit of a gaming medium for playing a game, is associated with a monetary amount in “pesos” as a specified currency unit, and currency information with one credit as one peso is set as basic currency information. The monetary amount per credit (1 credit=1 peso) can be switched by a denomination button 47 described later. As described above, in the slot machine 10, a specified currency unit (“pesos”) is set as the currency information in advance as the currency unit to be handled when the process is performed so that when the currency unit of a bill inserted into the bill entry 60 is a currency unit (for example, “dollars”) other than the specified currency unit, the PTS device 700 converts the currency unit into currency information that is based on the basic currency information “1 php, 1 credit” in the specified currency unit (“pesos”). That is, the bill entry 60 has a function of identifying the currency type (“pesos”, “dollars”, “yen”, etc.) and the monetary amount corresponding to the inserted bill, and when, for example, a dollar bill is inserted into the bill entry 60, the bill entry 60 transmits the inserted currency information including the currency unit information indicating that the currency unit of the inserted bill is “dollars” and the amount information indicating the monetary amount (one dollar) to the PTS device 700. In the PTS device 700, this information is converted to “pesos”, which is a specified currency type, based on an exchange rate. For example, when a 1 dollar bill is inserted, the PTS device 700 converts “dollars” to “pesos” based on the inserted currency information transmitted from the bill entry 60 and current exchange rate information (e.g., 1 usd=51 php) and converts it to currency information (e.g., 51 php, 51 credits). Currency information in the specified currency unit calculated in this manner is transmitted from the PTS device 700 to the game controller 70 of the slot machine 10, which will be described later.

The PTS device 700 is a unit in which an LCD (i.e., a liquid crystal display) 177, a human detection camera 713, a microphone 715, a speaker 707, and the like are integrated. The human detection camera 713 makes it possible to detect the presence or absence of a player with a camera. The microphone 715 is used by the player to participate in the game by voice or to authenticate the player by voice recognition. Further, the PTS device 700 has a card insertion slot to allow insertion of an IC card. Thus, the player can insert the IC card into the card insertion slot and use credit, stored on the IC card, in the slot machine 10.

(Control Panel 30)

Figure 2:
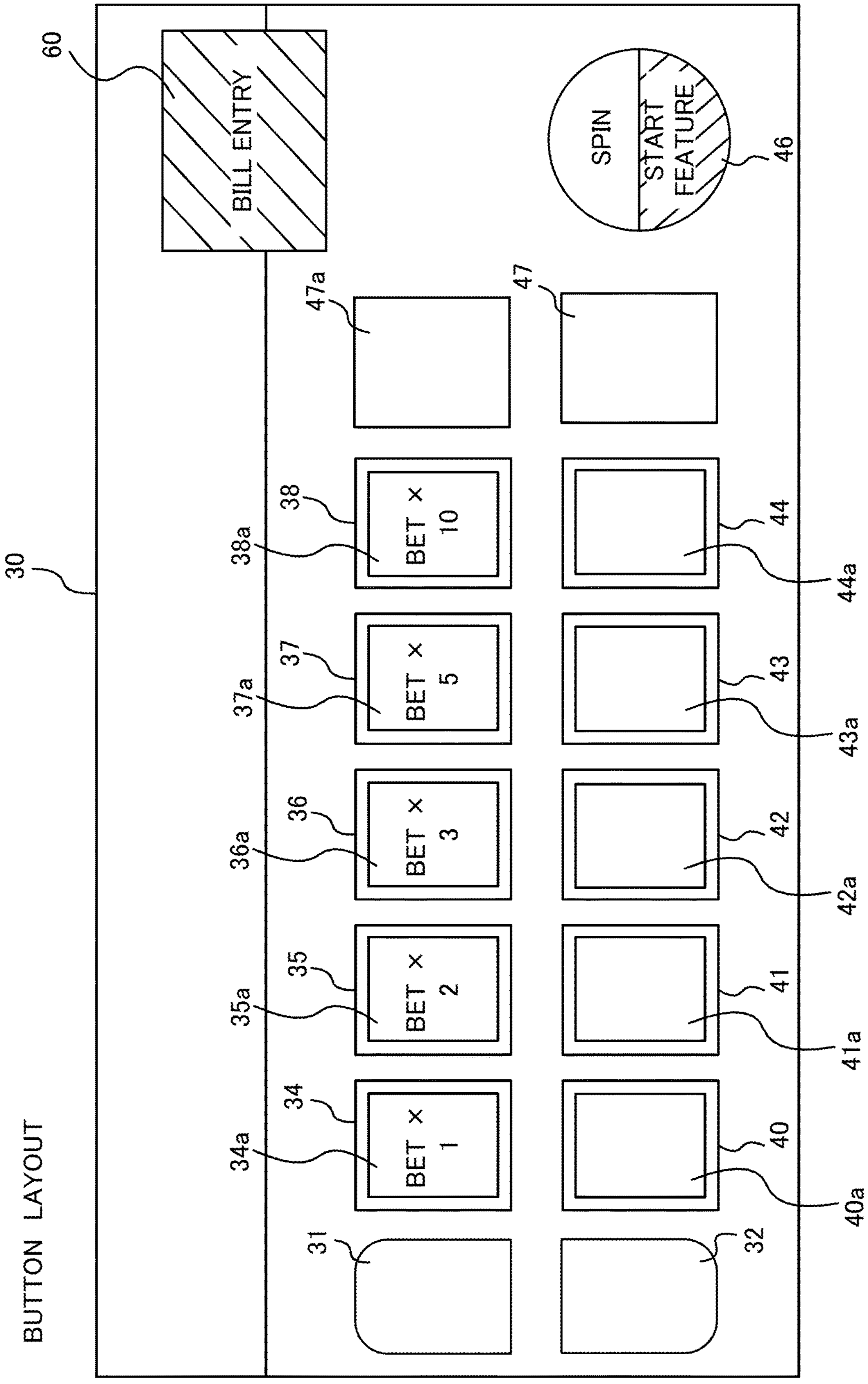
FIG. 2 is a plan view showing a configuration of a control panel.

As shown in FIG. 2, the control panel 30 has a CHANGE button 31 and a CASHOUT/TAKE WIN button 32 arranged in the left area, and a 1-BET button 34, a 2-BET button 35, a 3-BET button 36, a 5-BET button 37, a 10-BET button 38, a first credit button 40, a second credit button 41, a third credit button 42, a fourth credit button 43, and a fifth credit button 44 arranged in the center area. Further, the control panel 30 is provided with the above-mentioned bill entry 60 disposed in the upper stage of the right side region and a spin button 46 disposed in the lower stage of the right side area. A denomination button 47 for switching the amount of money per credit is also provided.

The CHANGE button 31 is an operation button used when leaving a seat or to request a staff member of a gaming facility to exchange money. The CASHOUT/TAKE WIN button 32 is an operation button used for settling credits deposited in the slot machine 10.

The first credit button 40, the second credit button 41, the third credit button 42, the fourth credit button 43, and the fifth credit button 44 are used for selecting the target areas for winning from 15 areas of 5 columns×3 rows on the symbol display area 150. The first credit button 40, the second credit button 41, the third credit button 42, the fourth credit button 43, and the fifth credit button 44 each have display devices 40*a*, 41*a*, 42*a*, 43*a*, 44*a*.

The display devices 40*a*, 41*a*, 42*a*, 43*a*, 44*a* are liquid crystal devices provided on the upper surfaces of the first credit button 40, the second credit button 41, the third credit button 42, the fourth credit button 43, and the fifth credit button 44, respectively.

The 1-BET button 34, the 2-BET button 35, the 3-BET button 36, the 5-BET button 37, and the 10-BET button 38 are buttons for determining a payout ratio with respect to a basic bet amount. The 1-BET button 34, the 2-BET button 35, the 3-BET button 36, the 5-BET button 37, and the 10-BET button 38 each have a display device 34*a*, 35*a*, 36*a*, 37*a*, 38*a*, respectively.

The display devices 34*a*, 35*a*, 36*a*, 37*a*, 38*a* are liquid crystal devices provided on the upper surface of the 1-BET button 34, the 2-BET button 35, the 3-BET button 36, the 5-BET button 37, and the 10-BET button 38, respectively.

In the present embodiment, a unit game is started when the credit amount (i.e., the bet amount) to be bet is determined by selecting an area (i.e., a selection from the five-step WAYS BET (WAYS BET1, WAYS BET2, WAYS BET3, WAYS BET4, WAYS BET5)) of the symbol display area 150 to be the result determination target and a payout (i.e., a selection from the six BET buttons (1-BET button 34, 2-BET button 35, 3-BET button 36, 5-BET button 37, 10-BET button 38)).

For example, a value obtained by multiplying the number of credits corresponding to the BET button by the credit amount required for the WAYS BET (i.e., 1 credit for WAYS BET1, 3 credits for WAYS BET2, 7 credits for WAYS BET3, 15 credits for WAYS BET4, and 25 credits for WAYS BET5) becomes the credit amount that is bet at the time of starting the unit game. For example, when the first credit button 40 and the 2-BET button 35 associated with "WAYS BET1" are selected, "1"×"2"=2 credits are bet. When the third credit button 42 and the 3-BET button 36 associated with "WAYS BET3" are selected, "7"×"3"=21 credits are bet. When the fifth credit button 44 and the 10-BET button 38 associated with "WAYS BET5" are selected, "25"×"10"=250 credits are bet.

The spin button 46 is a button used to start scrolling the video reel. The spin button 46 is also used for selecting and determining picks displayed on the lower image display panel 141.

Figure 4:
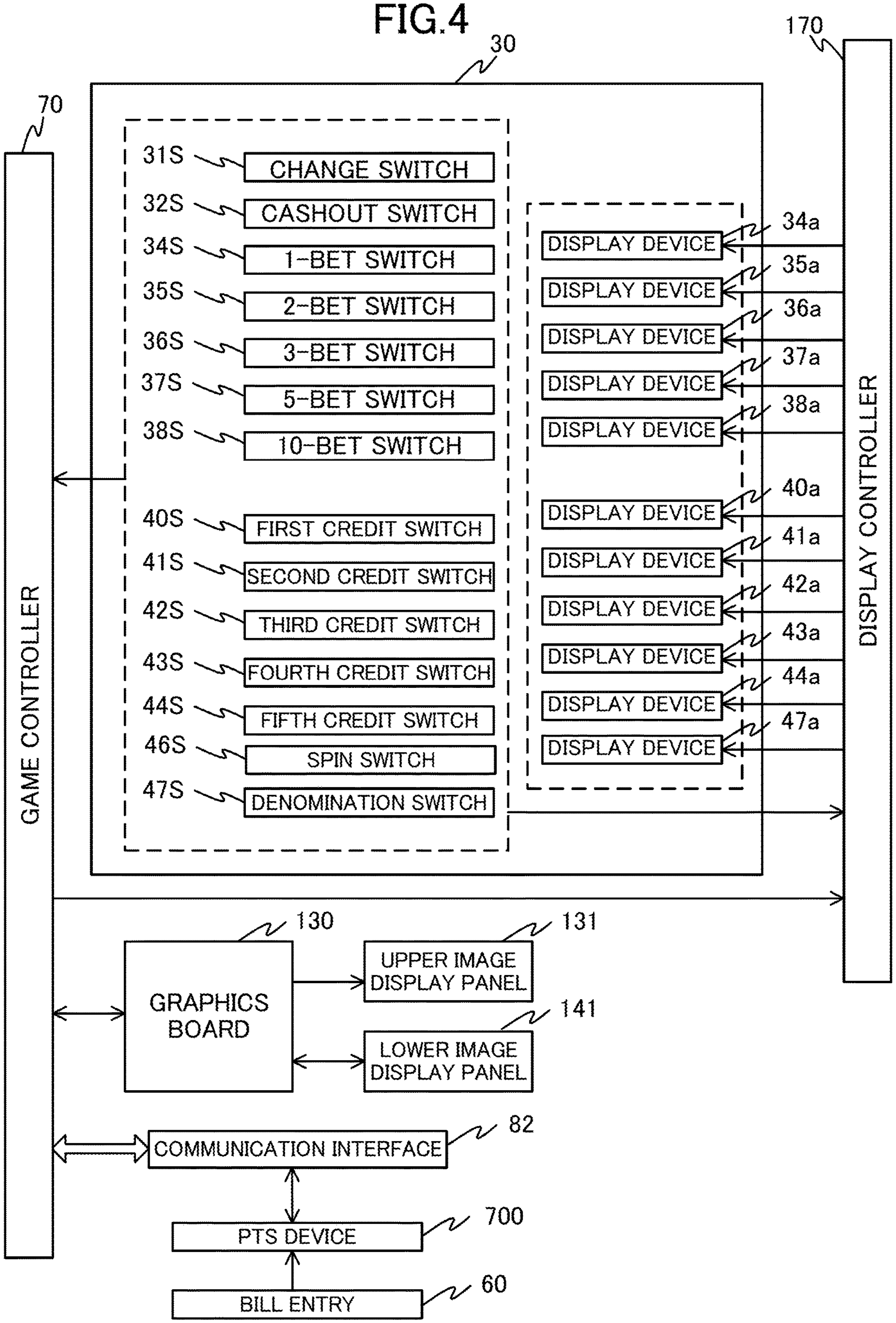
FIG. 4 is a block diagram showing an internal configuration of the slot machine and the control panel.

The denomination button 47 is a button for changing the monetary amount per credit, and a display device 47*a* configured with a liquid crystal device is provided adjacent to the denomination button 47. The monetary amount per credit is displayed on the display device 47*a*. When the denomination switch 47S shown in FIG. 4 is switched on by operating the denomination button 47, the monetary amount per credit displayed on the display device 47*a* is changed. That is, the player can change the monetary amount per credit by operating the denomination button 47 while watching the display of the display device 47*a*.

The monetary amount per credit displayed on the display device 47*a* is displayed as a monetary amount in the currency unit inserted by the player. Specifically, when the bill inserted into the bill entry 60 is, for example, "dollars", the inserted currency information that includes the currency unit and the monetary amount of the inserted bill is transmitted from the bill entry 60 to the PTS device 700. Even if the basic currency information in the slot machine 10 is set to "pesos" as the currency information per credit, the PTS device 700 displays the currency information in units of the inserted currency (for example, "dollars") on the display device 47*a* of the control panel 30 and the lower image display panel 141 (to be described later) of the slot machine 10 with an amount (for example, "1 credit=$0.01") reflecting the current currency exchange rate. In this display control process, the PTS device 700 directly controls the display of the display device 47*a* and the lower image display panel 141, but the present invention is not limited to this, and information for controlling the display may be transmitted from the PTS device 700 to the game controller 70, and controlling the display may be performed by the game controller 70. Further, by transmitting the inserted currency information from the bill entry 60 to the game controller 70 without using the PTS device 700, the monetary amount per credit may be calculated based on the exchange rate in the game controller 70, and the calculated amount may be displayed on the display device 47*a* and the lower image display panel 141.

As described above, the monetary amount per credit converted into the currency inserted by the player is displayed on the control panel 30, but in the slot machine 10, "pesos" is set as the specified currency unit, and therefore, in the process of the game controller 70, even when the bill inserted into the bill entry 60 is not of the specified currency unit (e.g., "pesos"), the monetary amount per credit is the monetary amount converted into the specified currency "pesos" and the processing of granting a bet or an award is performed according to the monetary amount in the specified currency.

That is, by operating the denomination button 47 while observing the display amount converted into "dollars" on the display device 47*a* of the control panel 30, the player can set the monetary amount per credit while observing the display amount converted into "dollars" which is the currency unit inserted by the player rather than the specified currency unit ("pesos") handled by the slot machine 10. Specifically, when the denomination button 47 is sequentially pressed, the display of the display device 47*a* is sequentially changed to "$0.01", "$0.1", and so on. The change result is transmitted from the control panel 30 to the PTS device 700. In the PTS device 700, the monetary amount per credit (i.e., the monetary amount converted in dollars) set by the denomination button 47 is converted into an amount of a specified currency unit (e.g., "pesos") handled by the slot machine 10, and the conversion result is transmitted to the game controller 70 (described later) of the slot machine 10. As a result, the game controller 70 performs the betting process and the process related to awarding a prize according to the result of converting the monetary amount per credit set by the player into the monetary amount in the specified currency unit ("pesos") (e.g., 1 peso per credit). The display for denomination switching in the lower image display panel 141 is configured to perform the same operation as the display and switching operation of the denomination button 47. The denomination indicator display and switching in the lower image display panel 141 are controlled from the PTS device 700 via the game controller 70 or controlled directly.

(Description of Control Panel Functions)

The control panel 30 of the present embodiment includes credit buttons 40, 41, 42, 43, 44 (i.e., a first credit button 40, a second credit button 41, a third credit button 42, a fourth credit button 43, and a fifth credit button 44) as a plurality of bet amount input devices for selecting bet objects. Each of the credit buttons 40, 41, 42, 43, 44 is provided with a display device 40*a*, 41*a*, 42*a*, 43*a*, 44*a* which can be seen from the outside, and different basic bet amounts are set according to differences in advantages.

Further, the control panel 30 is provided with bet buttons 34, 35, 36, 37, 38 (i.e., the 1-BET button 34, the 2-BET button 35, the 3-BET button 36, the 5-BET button 37, the 10-BET button 38) as a plurality of multiplying factor input devices which allow the player to select the payout ratio. Each of the plurality of multiplying factor input devices is mapped to a different payout ratio. The bet buttons 34, 35, 36, 37, 38 include display devices 34*a*, 35*a*, 36*a*, 37*a*, 38*a* that are visible from the outside, and display the payout ratio.

When one of the bet buttons 34, 35, 36, 37, 38 receives an input, the control panel 30 of the slot machine 10 displays values obtained by multiplying each set basic bet amount by a payout ratio, corresponding to the bet button 34-38 that received the input, on the display devices 40*a*, 41*a*, 42*a*, 43*a*, 44*a* of each of the credit buttons 40, 41, 42, 43, 44. Further, the display devices 40*a*, 41*a*, 42*a*, 43*a*, 44*a* display an amount obtained by multiplying the basic bet amount by the payout ratio corresponding to the bet button 34-38 that received the input, which is converted to the currency unit (for example, "dollars") inserted by the player. For example, in FIG. 3A, when the 1-BET button 34 is operated, the display devices 40*a*, 41*a*, 42*a*, 43*a*, 44*a* display 1, 3, 7, 15, and 25 credits, respectively, as values obtained by multiplying the basic bet amount set for the credit buttons 40, 41, 42, 43, 44 by the payout ratio corresponding to the bet button 34-38 that received the input, and displays $0.01, $0.03, $0.07, $0.15, $0.25 in the respective currency unit. That is, a player who has inserted a dollar bill into the bill entry 60 can see the amount converted and displayed in "dollars" as the currency unit on each of the credit buttons 40, 41, 42, 43, 44. For example, with respect to the display of 1, 3, 7, 15, and 25 credits displayed as bet amounts in the display devices 40*a*, 41*a*, 42*a*, 43*a*, 44*a*, respectively, when 1 BET button 34 is inputted, the monetary amount converted to "dollars," which the player himself/herself is accustomed to, is displayed together with the credit display. Thus, when the player designates 1-BET, the display devices 40*a*, 41*a*, 42*a*, 43*a*, 44*a* of each of the credit buttons 40, 41, 42, 43, 44 requires 1, 3, 7, 15, 25 credits when placing bets corresponding to WAYS BET1, WAYS BET2, WAYS BET3, WAYS BET4, and WAYS BET5, and the player can easily recognize that these credits are converted into the currency unit of the inserted currency and correspond to $0.01, $0.03, $0.07, $0.15, and $0.25, respectively. For instance, when the bill inserted into the bill entry 60 is "pesos", each credit amount is converted into the corresponding "pesos" of which amount is displayed together with the symbol "php" representing the currency "pesos".

Figure 3A:
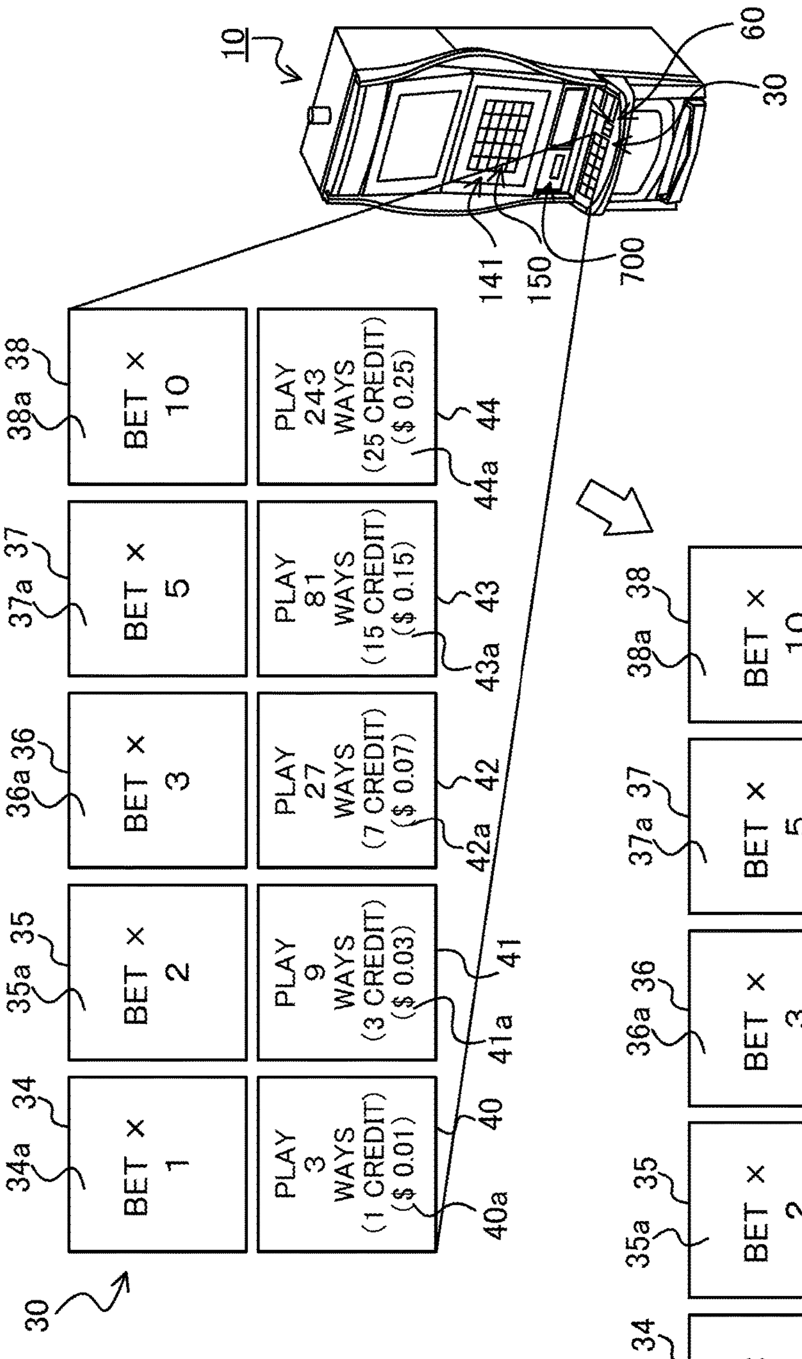
FIG. 3A and FIG. 3B are plan views showing a configuration of a control panel.
Figure 3B:
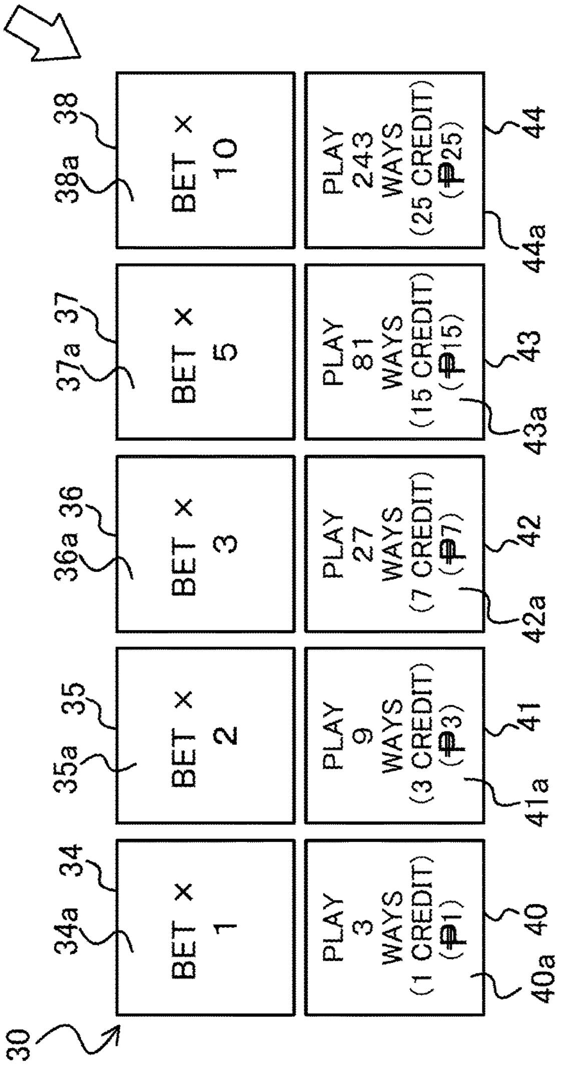

More specifically, in the control panel 30 shown in FIG. 3A, when the bill with a currency unit of "pesos" is inserted into the bill entry 60 under the condition that the display contents of the display devices 40*a* to 44*a* are "PLAY 3 WAYS (1 CREDIT) ($0.01)", "PLAY 9 WAYS (3 CREDITS) ($0.03)", "PLAY 27 WAYS (7 CREDITS) ($0.07)", "PLAY 81 WAYS (15 CREDITS) ($0.15), "PLAY 243 WAYS (25 CREDITS) ($0.25)", respectively, the PTS device 700 transmits to the game controller 70 that the currency unit of the inserted currency is "pesos" based on the inserted currency information outputted from the bill entry 60. As a result, the game controller 70 switches the display of each of the display devices 40*a*-44*a* of the control panel 30 via a display controller 170 to information having a currency unit of "pesos" as shown in FIG. 3B. That is, when the game controller 70 determines that the currency unit of the inserted bill is "pesos," the amount displayed on each display device 40*a*-44*a* of the control panel 30 (i.e., the monetary amount corresponding to the credit amount) is switched from the display of the monetary amount in the currency unit of "dollars" used until this time to the display of the monetary amount in the currency unit of "pesos". Conversion between currency units is performed by the PTS device 700. In this case, the amount is displayed together with a symbol representing the currency unit "pesos" (e.g., a symbol obtained by adding two horizontal lines to "P") or an image which can be associated with "pesos". The notation of the currency unit "pesos" is not limited to symbols shown in the respective display devices 40*a*-44*a* in FIG. 3B, and various other notations can be used, for example, characters representing the currency unit of "pesos" such as "1 php" or characters representing the currency unit printed on a bank note such as "1 PISO" can be used.

[Internal Configuration of Slot Machine]

Next, an internal configuration of the slot machine 10 and the control panel 30 provided in the slot machine 10 will be described with reference to FIG. 4.

The game controller 70 is provided on a game circuit board inside the slot machine 10. The display controller 170 is provided inside the control panel on a control panel circuit board different from the game circuit board of the game controller 70. The game controller 70 and the display controller 170 each include a CPU (Central Processing Unit) provided on a circuit board for a game and a circuit board for a control panel, a program executed by the CPU and an EEPROM (Electrically Erasable and Programmable Read Only Memory) for rewritably storing data used in these programs, and a Random Access Memory (RAM) for temporarily storing data when the program is being executed. The game controller 70 and the display controller 170 are constructed by cooperation of the hardware and software, in the storage device as described above. Note that the display controller 170 is not limited to being provided separately from the game controller 70, and the game controller 70 may have the function of the display controller 170.

For example, data and programs used when the CPU operates are stored in the storage device of the game controller 70. For example, the game controller 70 may store the aforementioned game programs, game system programs, and authentication programs when they are imported from an external storage device. The storage device of the game controller 70 is provided with a work area for executing the program. For example, an area for storing the credit amount, the number of BETs, the number of payout amounts, the credit amounts, and the like, an area for storing a symbol (i.e., a code number) determined by a random determination, and the like are provided.

As described above, the game controller 70 executes the game, and controls the symbol display device 150 so as to rearrange the symbols according to the game. The game controller 70, as described above, activates a number of winning lines corresponding to the credit buttons 40, 41, 42, 43, 44 that have received input in a display frame of three rows and five columns consisting of a plurality of blocks, and provides a line payout corresponding to the type of symbol when the same number of symbols of the same type is rearranged in the enabled winning lines. That is, the game controller 70 is configured to control the slot machine by way of the CPU executing the game program or the game system program in the storage device. The display controller 170 has a graphics board and displays the bet amount required for the display devices 40*a*, 41*a*, 42*a*, 43*a*, 44*a* of the credit buttons 40, 41, 42, 43, 44.

The control panel 30 is provided with a CHANGE switch 31S, a CASHOUT switch 32S, a 1-BET switch 34S, a 2-BET switch 35S, a 3-BET switch 36S, a 5-BET switch 37S, a 10-BET switch 38S, a first credit switch 40S, a second credit switch 41S, a third credit switch 42S, a fourth credit switch 43S, a fifth credit switch 44S, a spin switch 46S, and a denomination switch 47S corresponding to the buttons described above. Each switch detects that the corresponding button has been pressed by the player, and outputs a signal to the game controller 70 and the display controller 170. The game controller 70 controls betting based on signals from the respective switches. The display controller 170 transmits signals from the respective switches to the game controller 70, and the game controller 70 determines the contents to be displayed on the display devices 34*a* to 38*a* and 40*a* to 44*a* provided on the buttons 34 to 38 and 40 to 44 based on these signals, and transmits the determination result to the display controller 170, thereby causing the buttons to be displayed.

In addition to a speaker, a touch panel, and the like, a graphics board 130, a power supply unit 81, and a communication interface 82 are connected to the game controller 70.

The graphics board 130 controls display of images displayed by the upper image display panel 131 and the lower image display panel 141 based on control signals outputted by the game controller 70. The graphics board 130 includes a VDP for generating image data, a video RAM for storing image data generated by the VDP, and the like.

The graphics board 130 includes a VDP (Video Display Processor) for generating image data based on control signals outputted from the game controller 70, a video RAM for temporarily storing image data generated by the VDP, and the like. The image data used when image data is generated by the VDP is included in the game program of the storage device. The graphics board 130 has a function of outputting operation results of various touch icons provided on the lower image display panel 141 to the game controller 70.

The communication interface 82 is for performing communication with the PTS device 700 and an external controller. When an input signal is received from the bill entry 60, the PTS device 700 transmits the inserted currency information contained in the input signal to the game controller 70 via the communication interface 82. When an IC card is inserted into the card insertion slot, the PTS device 700 transmits credit data stored on the IC card to the game controller 70 via the communication interface 82. The PTS device 700 writes credit data to the IC card inserted into the card insertion slot based on the control signal received from the game controller 70 via the communication interface 82.

The game controller 70 is also enabled to transmit signals to the display controller 170 using known communication protocols and connections. For example, the game controller 70 transmits, to the display controller 170, a signal indicating whether or not various buttons can accept inputs.

(Configuration of the PTS Device)

Next, a configuration of a circuit in the PTS device 700 will be described with reference to FIG. 5.

The PTS controller 750 for controlling the PTS device 700 includes a CPU 751, a ROM 752, and a RAM 753.

The CPU 751 executes and controls the components of the PTS device 700 and executes and calculates various programs stored in the ROM 752.

The ROM 752 comprises a memory device such as a flash memory unit, in which permanent data to be executed by the CPU 751 is stored. For example, a credit updating program or the like for rewriting credit-related data stored on an IC card (not shown) connected via an IC-card I/F (interface) 763 can be stored in the ROM 752.

The RAM 753 temporarily stores data required for executing various programs stored in the ROM 752.

The external storage device 754 is, for example, a storage device such as a hard disk drive, and stores a program executed by the CPU 751 and data used by the program executed by the CPU 751.

A server I/F 755 implements data communication between an external server such as a hall management server and the PTS device 700. The gaming machine I/F (interface) 756 implements data communication between the game controller 70 of the slot machine 10 and the PTS device 700 via the communication interface 82 (see FIG. 4) on the slot machine 10 side, and a prescribed protocol can be used for the data communication.

Further, the PTS device 700 is connected to the bill entry 60, which is a bill validator, via a bill entry I/F (interface) 757, and is also connected to a settlement machine (not shown) via a settlement machine I/F (interface) 758, and can transmit and receive data to and from the settlement machine as necessary.

The IC card control unit 741 controls insertion and ejection of an IC card, writing of credit data, and the like. The IC card control unit 741 includes an IC card R/W (reader/writer) control unit, an IC card suction/discharge control unit, an LED control unit, and the like.

The DSP 765 receives audio data acquired from the microphone 715, performs a predetermined audio process, and then transmits the data to the CPU 751. The DSP 765 also transmits the received audio data to the speaker 707. Further, the DSP 765 outputs the received sound to headphones through an audio terminal connected to the headphones, processes the sound received from the microphone, and transmits the processed sound to the CPU 751. Here, a schematic configuration is shown, and an A/D converter, a D/A converter, an amplifier, and the like are omitted.

A camera control unit 766 acquires an image of the player or the like captured by the human detection camera 713, performs predetermined image processing as required, and transmits the processed data to the CPU 751. The data is transmitted to, for example, a hall management server via the server I/F 755.

(Data Table)

Figure 5:
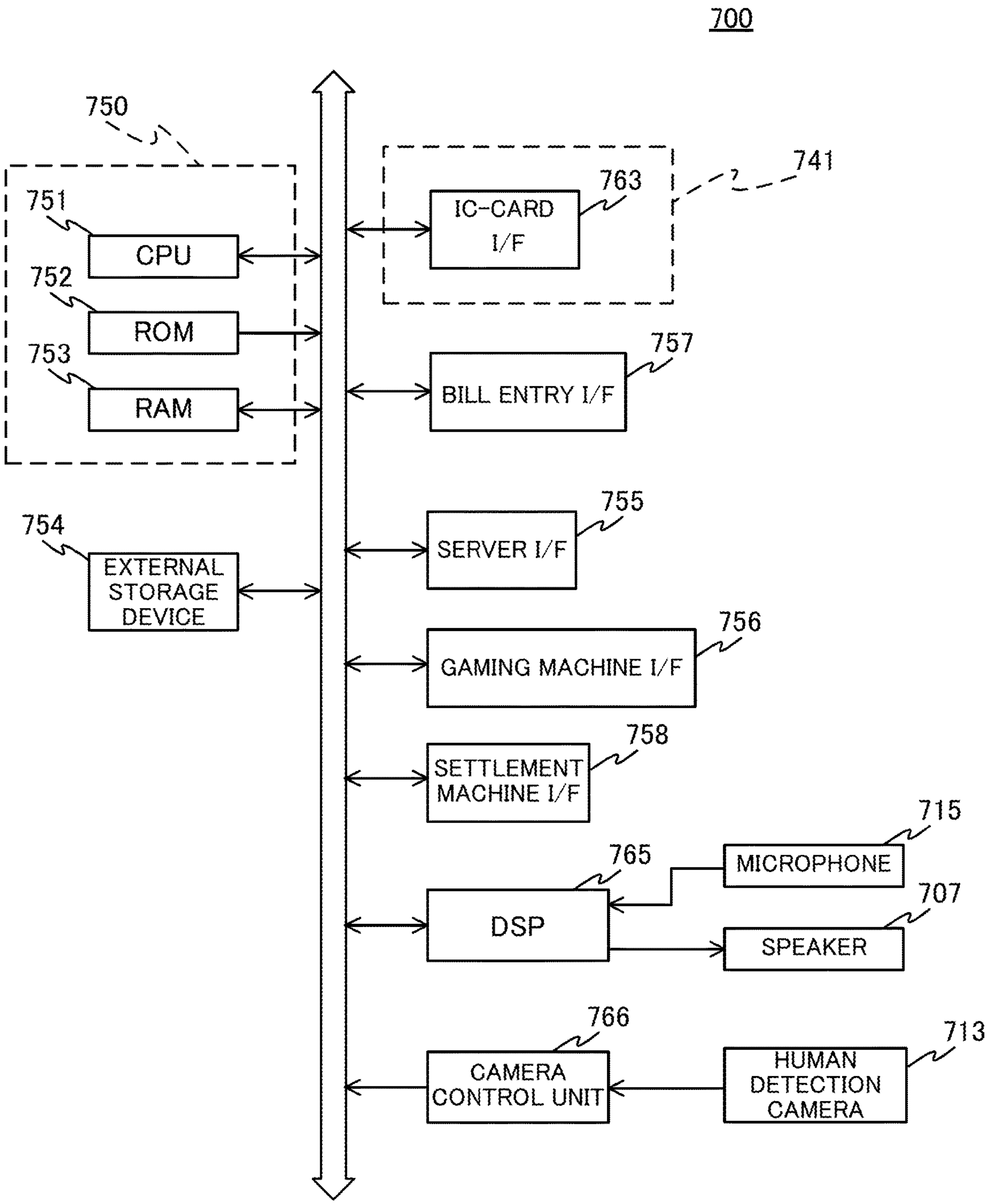
FIG. 5 is a block diagram showing a configuration of a PTS (Player Tracking System) device.

In the PTS device 700 illustrated in FIGS. 4 and 5, when a currency such as a bill is inserted into the bill entry 60, the inserted currency information (i.e., currency unit, amount) outputted from the bill entry 60 is stored in the RAM 753. As shown in FIG. 6A, in the storage area of the RAM 753, the exchange rate of the currency unit (for example, “dollars”) of the bill inserted by the player and the specified currency unit (for example, “pesos”) set in the slot machine 10 are stored.

Each time a currency is received at the bill entry 60, the CPU 751 communicates with external servers to obtain the exchange rate between the relevant currency unit and the specified currency unit. For example, when the inserted currency is “dollars,” the CPU 751 obtains the exchange rate of “dollars” and “pesos”, which is a particular currency unit, from outside and stores the exchange rate in the RAM 753.

Thus, in response to a request from the game controller 70 of the slot machine 10, the PTS device 700 can convert the monetary amount of the prize generated in accordance with the progress of the game, for example, from the specified currency unit (e.g., “pesos”) used in the processing of the slot machine 10 (i.e., the game controller 70) to a currency unit (e.g., “dollars”) of the bill inserted by the player at this time, and return the result to the game controller 70. The result of the conversion (e.g., the amount in “dollars”) is displayed on the display panel (i.e., the upper image display panel 131 or the lower image display panel 141, etc.) of the slot machine 10. That is, in the slot machine 10 that processes a game in the specified currency unit (e.g., "pesos"), the monetary amount of a prize or the like generated by the progress of the game is displayed in a monetary amount converted into the currency unit (e.g., "dollars") inserted by the player, and the monetary amount can be displayed in a currency that the player is accustomed to.

The game controller 70 shown in FIG. 4 has a bet amount table in which the credit buttons 40, 41, 42, 43, 44 and the bet buttons 34, 35, 36, 37, 38 are mapped to each other in the storage device.

As shown in FIGS. 6B and 6C, the bet amount table stores bet amounts mapped to a plurality of payout ratios (1-BET, 2-BET, 3-BET, 5-BET, 10-BET) and a plurality of basic bets (3WAYS, 9WAYS, 27WAYS, 81WAYS, 243WAYS).

For example, when the second credit button 41 is inputted, the credit amounts (2, 6, 14, 30, 50) in the row 2-BET is displayed on the display devices 40*a*, 41*a*, 42*a*, 43*a*, 44*a*, respectively.

Further, each bet amount stored in the bet amount table shown in FIGS. 6B and 6C is stored in a currency amount mapped to each bet amount. The currency amount includes specified currency information such as an amount represented in the currency of "pesos" per credit (for example, one credit is one peso) when the specified currency unit set in advance in the slot machine 10 is "pesos." In the bet amount table, a relationship between a currency unit (e.g., "dollars") other than the specified currency unit and a credit (e.g., one credit is $0.01) is stored as other currency information (i.e., currency information including a currency unit other than a specified currency unit). This table is periodically overwritten to reflect the current exchange rate. Although the relationship between "pesos", "dollars", and credits is tabulated in FIGS. 6B and 6C, other currency types are also taken in and tabulated as appropriate. Further, the bet amount table shown in FIGS. 6B and 6C, may be provided to, for example, the PTS device 700, the display controller 170, or the like instead of the game controller 70.

[Program Content]

Next, a program executed by the game controller 70 of the slot machine 10 will be described.

(Main Control Process)

Figure 7:
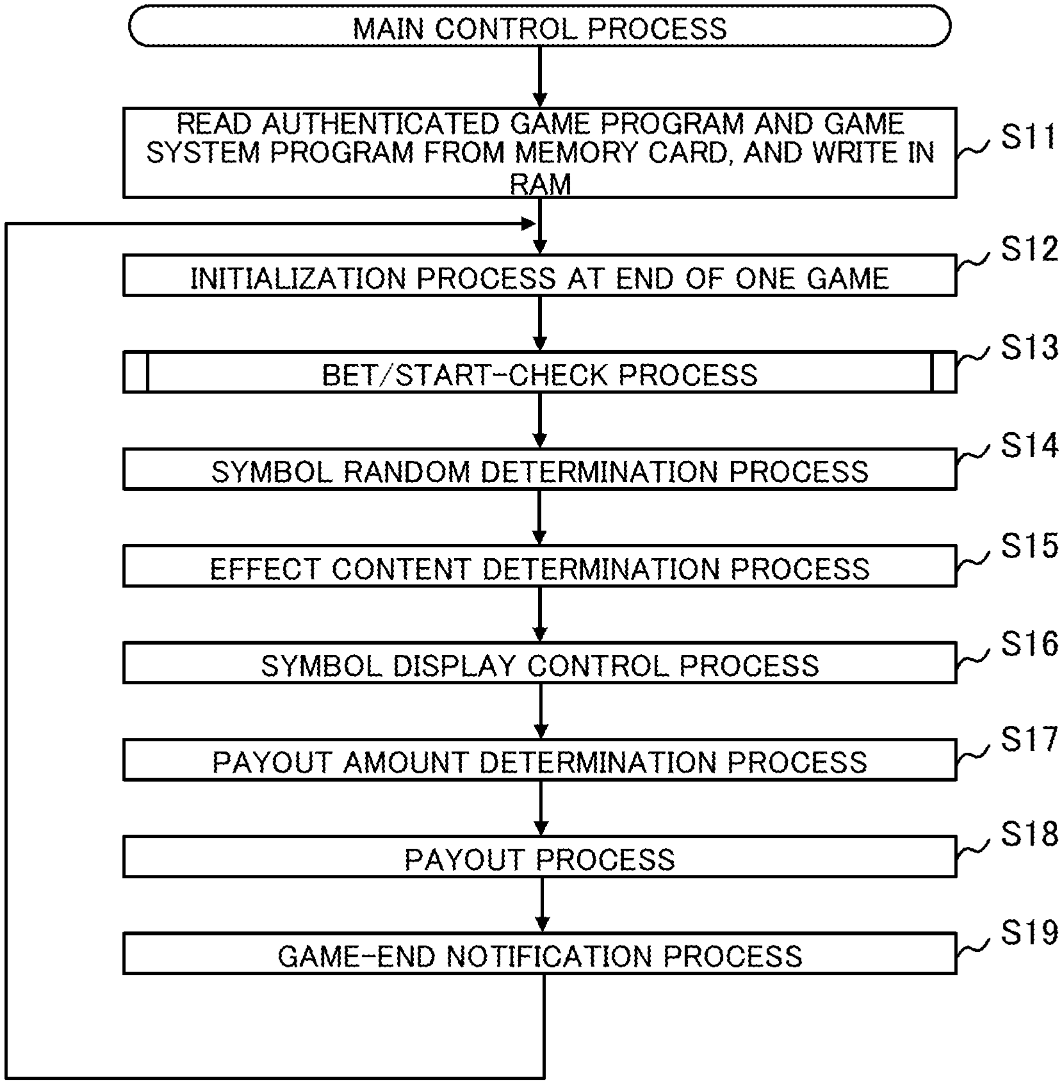
FIG. 7 is a flowchart showing a main control process.

First, a main control process will be described with reference to FIG. 7.

First, when the slot machine 10 is powered on, the game controller 70 reads out the game program and the game system program and writes them in the RAM (S11).

Next, in order to start the game, the game controller 70 performs an initialization process at the end of one game (S12). For example, unnecessary data is cleared for each game in a single normal mode in the RAM work area, such as the bet amounts and symbols determined by random determination.

Next, the game controller 70 performs a bet/start-check process, which will be described later (S13). In this process, the inputs of the 1-BET switch 34S, the 2-BET switch 35S, the 3-BET switch 36S, the 5-BET switch 37S, the 10-BET switch 38S, the first credit switch 40S, the second credit switch 41S, the third credit switch 42S, the fourth credit switch 43S, the fifth credit switch 44S, the spin switch 46S, the denomination switch 47S, and the like are checked. In the bet/start-check process (S13), when insertion information indicating that a bill has been newly inserted is received from the PTS device 700, the game controller 70 updates the specified currency information (i.e., the monetary amount shown in a particular currency "pesos" and the credit amount corresponding to the monetary amount) stored in the game controller 70 for the player to play the game. Specifically, the specified currency information converted from the amount of the newly inserted bill is added to the specified currency information already stored in the storage unit. That is, the slot machine 10 is configured to perform game processing (i.e., betting, payout calculation, payout, etc.) in the specified currency unit (e.g., "pesos"), and in the game controller 70, the monetary amount of the bill inserted by the player or the award given as a result of a game is managed as specified currency information in the specified currency unit.

When a bill of the specified currency unit (e.g., "pesos") is inserted into the bill entry 60, the monetary amount of the inserted specified currency unit (e.g., "pesos") and the credit amounts corresponding thereto are stored in the storage unit of the game controller 70. Note that "storage" here is a concept that includes adding to the monetary amount and the credit amount of the currency information when specified currency information for the player to play the game has already been stored in the storage unit of the game controller 70. This information may be stored in the storage unit of the PTS apparatus 700.

On the other hand, when the currency unit of the newly inserted bill is different from the specified currency (for example, when "dollars" are inserted), the specified currency information resulting from the conversion from the inserted monetary amount in the inserted currency unit to the monetary amount in the specified currency unit (e.g., "pesos") is stored in the storage unit of the game controller 70. This conversion is executed in the PTS device 700, and the conversion result is transmitted from the PTS device 700 to the game controller 70 and stored.

In this manner, when a bill is inserted into the bill entry 60, the specified currency information for playing the game stored in the game controller 70 is updated based on the amount of the bill inserted at this time, and then the inputs of the 1-BET switch 34S, the 2-BET switch 35S, the 3-BET switch 36S, the 5-BET switch 37S, the 10-BET switch 38S, the first credit switch 40S, the second credit switch 41S, the third credit switch 42S, the fourth credit switch 43S, the fifth credit switch 44S, the spin switch 46S, and the like are checked.

Next, the game controller 70 performs a symbol random determination process (S14). In this process, a symbol to be displayed in a region in the middle stage of the symbol display area 150 is determined as a to-be-stopped symbol from among a plurality of symbols arranged on the video reel. As a result, 15 symbols to be displayed in the symbol display area 150 (the upper stage region, the middle stage region, and the lower stage region) are determined.

The game controller 70 then stores the determined to-be-stopped symbol in a symbol storing area provided in the RAM.

Next, the game controller 70 performs an effect content determination process (S15). The game controller 70 extracts an effect-use random number and determines one of a plurality of effect contents determined in advance by random determination.

Next, the game controller 70 performs a symbol display control process (S16). In this symbol display control process, scrolling of the video reel is started, and after a predetermined time has elapsed, the to-be-stopped symbol determined in the normal mode symbol random determination process of S14 are sequentially stopped in the middle stage of the symbol display area 150. That is, 15 symbols including the to-be-stopped symbol are rearranged in the symbol display area 150. That is, symbols corresponding to code numbers before and after the to-be-stopped symbol are rearranged in the upper and lower stages of the symbol display area 150.

Next, the game controller 70 performs payout amount determination process (S17). In this process, on the basis of the symbol combination table stored in the RAM, it is determined whether or not a predetermined number of symbols of the same type are connected to the first to fifth array area and winning is established in the region which is the target of result determination by the WAYS BET of the symbol display area 150. A privilege such as a payout or a right to execute a free game is awarded in accordance with the value of a winning or bet counter (i.e., the bet credit type). The awarded payout is stored in a payout amount storage area provided in the RAM.

Next, a payout process is performed (S18). The game controller 70 adds the value stored in the payout amount storage area to the value of the credit counter provided in the RAM. For example, when the player presses the CASHOUT button 32 of the control panel 30, the detected CASHOUT switch (not shown) outputs a signal to the main CPU (not shown) of the game controller 70, and the credit amount stored on the IC card stored in the IC card control unit 741 is updated to the value of the credit counter.

Further, coins may be discharged from the slot machine 10 based on input of the CASHOUT button 32.

Next, the main CPU 1071 performs a game-end notification process (S19). This process is a process of transmitting data, indicating that one unit game has ended, to the PTS device 700. The PTS device 700 transmits the data to a hall management server, and a random determination of a bonus game or the like is performed in response to the data. When the process of S19 ends, the routine returns to the process of S12, and the game unit is repeated.

(Denomination Process)

Figure 8:
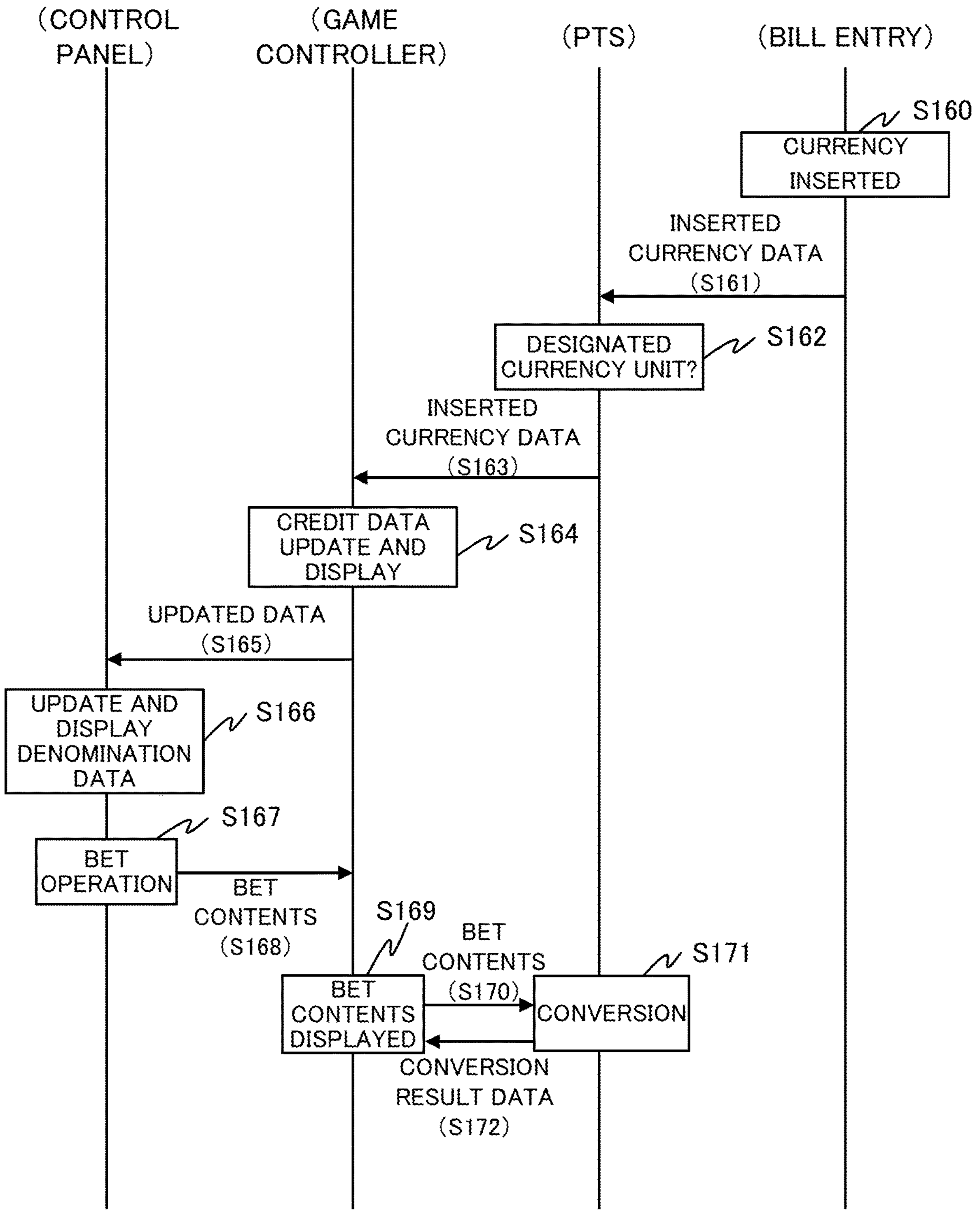
FIG. 8 is a flowchart showing a denomination process.

FIG. 8 is a flowchart showing a display process for credit data of an inserted currency that is executed in the game controller 70, the PTS device 700, and the control panel 30 and the bill entry 60 of the of the slot machine 10.

When a bill is inserted into the bill entry 60 (S160), the inserted currency information indicating the monetary amount in the currency unit of the inserted currency is transmitted from the bill entry 60 to the PTS device 700 (S161). With information indicating the type of a specified currency unit (e.g., "pesos") that is set in advance in the game controller 70 of the slot machine 10 stored in the RAM 753, the PTS device 700 determines whether or not the currency unit of the inserted bill matches with the specified currency unit (S162). In this determination process, when it is determined that the information match, the monetary amount information expressed in the specified currency unit is transmitted to the game controller 10 of the slot machine 10 as inserted currency information (S163). On the contrary, when the currency unit of the inserted currency is determined to be different from the specified currency unit, the currency unit different from the particular currency units, based on the exchange rate stored in the RAM 753 of the PTS device 700 (see FIG. 6A), the monetary amount information is converted to a monetary amount expressed in the specified currency unit, and information indicating the inserted currency unit, the information indicating the monetary amount in the currency unit before conversion (i.e., the currency unit of the inserted bill), and information indicating the monetary amount in the specified currency unit after conversion are transmitted to the game controller 70 of the slot machine 10 as inserted currency information (S163).

When only the information indicating the monetary amount expressed in the specified currency unit is transmitted from the PTS device 700, the game controller 70 (which specifically refers to the CPU inside the game controller 70) determines that the inserted currency unit is the specified currency unit, and updates credit data stored inside the game controller 70 by adding the inserted monetary amount to the credit data (S164). On the other hand, when the information indicating a currency unit other than the specified currency unit and the monetary amount before and after conversion are transmitted from the PTS device 700, against which has been transmitted, the game controller 70 updates the credit data based on information indicating the currency unit and information of the monetary amount before and after conversion (S164).

In this embodiment, the game controller 70, "pesos" is stored (i.e., set) in advance in the storage unit as the specified currency unit, and in contrast to the monetary amount information stored as credit data when the specified currency is inserted, when a currency other than the specified currency unit is inserted, information indicating the currency unit of the inserted currency (i.e., information indicating the type of currency unit, image data (i.e., symbols) for visually displaying the type), information indicating the monetary amount in the inserted currency unit, and information indicating the monetary amount resulting from converting the monetary amount in the inserted currency to the specified currency unit are stored, as a set, as credit data.

That is, in the update and display process of the credit data (S164), when the currency of the specified currency unit is inserted, only information indicating the monetary amount in the specified currency unit and the corresponding credit amount information is stored as credit data, and when a currency other than the specified currency unit is inserted, information indicating the inserted currency unit, information indicating the monetary amount in the inserted currency unit, information indicating the monetary amount converted to the specified currency unit, and information indicating the credit amount corresponding to the monetary amount are stored as credit data, and, as a result, the player can understand the currency unit displayed by the game controller 70 when confirming the contents of the credit data.

That is, the game controller 70 checks the information stored as credit data, when the monetary amount information in the specified currency unit and the monetary amount information in a currency unit other than the specified currency unit (and information indicating the credit amounts corresponding to these monetary amount information) is stored as a set, it is possible to determine that currency other than the currency in the specified currency unit was inserted, and in this case, by displaying the monetary amount indicating the inserted currency unit other than the specified currency unit on the lower image display panel 141 (described later in FIGS. 9 and 10), in contrast to internal processing done with the monetary amount expressed in the specified currency unit stored as credit data, the amount to be displayed can be the monetary amount that has been converted to the inserted currency unit. Further, in this case, in addition to the monetary amount, displaying an image (i.e., a symbol) indicating the type of currency unit (i.e., a currency unit other than the specified currency unit), the player can be made to easily understand the currency unit associated with the monetary amount displayed. For example, when the currency unit of the inserted bill is "dollars", that is, a currency unit other than the specified currency unit (e.g., "pesos"), a display of "$10" is displayed. In other words, the currency unit can be indicated by displaying the symbol "$", which represents "dollars", before the number. Note that an image (i.e., a symbol) representing the currency unit is not limited to this dollar sign, and, for example, an image that impressively represents a large "dollar" in another display frame (e.g., an image or the like that represents the national flag) may be used.

In contrast, if only the monetary amount expressed in the specified currency, as credit data, is stored, the game controller 70 displays the monetary amount in the specified currency unit on the lower image display panel 141.

Note that in the state in which a bill in a currency other than the specified currency is displayed in a currency unit other than the specified currency unit by being inserted, the game controller 70 that has received the inserted currency information (S163) from the PTS device 700 when a bill of the specified currency unit is newly inserted into the bill entry 60, in the credit data update and display process (S164), from among the monetary amount information in the specified currency unit which has been stored until then and the monetary amount information in a currency unit other than the specified currency unit, the monetary amount information in the currency unit other than the specified currency unit is deleted, and by limiting to the monetary amount information in the specified currency unit, the information that is to be displayed is determined to be the monetary amount information in the specified currency unit. Incidentally, regarding which currency to display in, dedicated information may be separately stored, as currency information to be displayed, in the storage unit of the game controller 70.

In this process (S164), the content displayed on the lower image display panel 141 (i.e., the denomination touch icon 201 described later with reference to FIGS. 9 and 10) is also updated. That is, the game controller 70 displays the monetary amount per credit set in the game controller 70 on the denomination touch icon 201 and displays the monetary amount in the currency unit (e.g., "dollars") of the inserted currency Even when the monetary amount (i.e., the monetary amount per credit) is changed by touching the denomination touch icon 201, the information for controlling the display is updated so that the monetary amount is changed and displayed in the currency unit (e.g., "dollars") of the inserted currency. In this way, when the currency unit of the inserted currency is a currency unit other than the specified currency unit (e.g., "dollars"), on the denomination touch icon 201, the monetary amount per credit is displayed in "dollars" together with a symbol representing the currency unit (FIG. 9), whereas when the currency unit of the input currency is the specified currency unit (e.g., "pesos"), the monetary amount per credit is displayed in "pesos" together with a symbol representing the currency unit (FIG. 10A). Then, in accordance with the touch operation of the denomination icon 201, the game controller 70 changes and displays the monetary amount per credit while keeping the currency unit (i.e., as "dollars" when "dollars" are inserted, or as "pesos" when "pesos" are inserted).

Further, in this process, the function assigned to the denomination button 47 of the control panel 30 (i.e., the function specifying the monetary amount per credit to be switched in one operation) is switched by changing the inserted currency. Specifically, in the case where the inserted currency is a currency unit other than the specific currency unit (e.g., "dollars"), each time the denomination button 47 is operated, for example, the processing content in the game controller 70 is switched so that the monetary amount per credit is changed to "0.01 dollars", "0.1 dollars", "1.0 dollar", "5.0 dollars" or "10 dollars", whereas in the case where the inserted currency is in the specified currency unit (e.g., "pesos"), each time the denomination button 47 is operated, the processing content in the game controller 70 is changed so that the monetary amount per credit is changed to "1 peso", "10 pesos", "100 pesos", "500 pesos" or "1000 pesos".

When credit data is updated in the game controller 70, the updated information is transmitted to the control panel 30 (S165). In the control panel 30, the display information stored in the display controller 170 is updated based on the updated information transmitted from the game controller 70 (S166). The display information is information for displaying bet amounts displayed on the display devices 40*a*, 41*a*, 42*a*, 43*a*, 44*a* of the control panel 30 (i.e., bet amounts assigned to each of the credit buttons 40, 41, 42, 43, 44) and is image data of specific text for displaying monetary credit amounts required to bet in the specified currency unit or the currency unit of the inserted currency which is different from the specified currency unit. For example, when the inserted currency is in the specified currency unit (for example, "pesos"), as shown in FIG. 3B, the credit amount required for betting is displayed on the display devices 40*a*, 41*a*, 42*a*, 43*a*, 44*a*, and the corresponding amount is displayed in the specified currency unit (for example, "pesos"). On the other hand, when the currency unit of the inserted currency is in a currency unit other than the specified currency unit (e.g., "dollars"), as shown in FIG. 3A, the credit amount required for betting is displayed on the display devices 40*a*, 41*a*, 42*a*, 43*a*, 44*a*, and the corresponding amounts are displayed in the currency unit of the inserted currency (e.g., "dollars"). Display information (i.e., the bet amount table shown in FIGS. 6B and 6C) for performing this display is stored in the game controller 70, and by referring to this bet amount table, the game controller 70 selects information to be displayed on the display devices 40*a*, 41*a*, 42*a*, 43*a*, 44*a* of the control panel 30 (i.e., the number of bets required to start the game and the amount corresponding to the number of bets (i.e., the amount represented by the specified currency when the inserted currency is only a specified currency, and the amount represented by a currency unit of the inserted currency when the inserted currency is not the specified currency unit) and transmits it to the display controller 170. Based on this information, the display controller 170 displays the corresponding information on each of the display devices 40*a*, 41*a*, 42*a*, 43*a*, 44*a* of the control panel 30. The display controller 170 also controls the displays on the display devices 34*a* to 38*a* of the control panel 30. Thus, if the currency unit of the inserted bill is different from the currency inserted until that time, the update and display process of the credit data (S164) and the update and display process of the denomination information (S166) changes the monetary amounts (i.e., the currency unit) displayed on the display devices 40*a*, 41*a*, 42*a*, 43*a*, 44*a* of the control panel 30. In this process (S166), the display content when the denomination switch 47S (FIG. 5) is switched by the denomination button 47 is also updated. That is, although the monetary amounts displayed on the display devices 40*a*, 41*a*, 42*a*, 43*a*, 44*a* by operation of the denomination button 47 are displayed in the currency unit of the inserted currency (e.g., "dollars", "pesos", etc.), even when the monetary amounts are changed by the operation of the denomination button 47, the display information is updated so that the monetary amounts are changed and displayed in the currency unit of the inserted currency (e.g., "dollars", "pesos", etc.).

The monetary amount per credit can be changed by either operating the denomination button 47 or the denomination touch icon 201. When the change is made by operating the denomination button 47, the game controller 70 similarly changes the display of the display device 47*a* and the denomination touch icon 201 associated with the denomination button 47 based on the change result, and when the monetary amount per credit is changed by operating the denomination touch icon 201, the game controller 70 similarly changes the display of the denomination touch icon 201 and the display device 47*a* based on the change result.

Specifically, in the case where a currency unit (for example, "dollars") other than the specified currency unit is inserted into the bill entry 60, when "1 credit=0.01 dollars" is set by denomination switching, the assigned amount and display of each button are set by the game controller 70 on the basis of "1 credit=0.01 dollars" as shown in FIG. 3A, and when the denomination is switched to "1 credit=0.1 dollars" by operation of the denomination button 47 or the denomination touch icon 201, the assigned amount and display of each button are set by the game controller 70 on the basis of "1 credit=0.1 dollars". When the player operates each of the buttons 34 to 38 and 40 to 44 in this state, conversion from the amount per credit (i.e., the credit amount or an amount corresponding to the credit amount) assigned to the button operated in accordance with the operation result to the specified currency unit is executed by the game controller 70, and the game controller 70 proceeds with processing such as calculation of a game bet and a game payout with the converted amount in the specified currency unit. That is, while the amounts displayed on the display devices 34*a* to 38*a* and 40*a* to 44*a* assigned to the respective buttons 34 to 38 and 40 to 44 of the control panel 30 are expressed in "dollars", which is the currency unit of the inserted bill, in the processing of the game controller 70, the calculation of the payout is based on "pesos" which is the specified currency unit.

On the other hand, in the case where a bill of "pesos", which is the specified currency unit, is inserted into the bill entry 60, when "1 credit=1 peso" is set by denomination switching, the assigned amount and display of each button are set by the game controller 70 on the basis of "1 credit=1 peso" as shown in FIG. 3B, and when the denomination is switched to "1 credit=10 pesos" by operation of the denomination button 47 or the denomination touch icon 201, the assigned amount and display of each button are set by the game controller 70 on the basis of "1 credit=10 pesos". In this state, when the player operates each of the buttons 34 to 38 and 40 to 44, the game controller 70 proceeds with calculating the bet and the payout of the game with monetary amounts in the specified currency unit (for example, "pesos") based on the amount per credit (i.e., the credit amount or an amount corresponding to the credit amount) assigned to the button operated in accordance with the operation result.

In this manner, in the game controller 70, when the player operates the control panel 30 to input a bet (S167) in a state in which the credit data is updated and the lower image display panel 141 and the display on each of the display devices of the control panel 30 are updated, the bet information (i.e., operation information) indicating the bet information is transmitted from the control panel 30 to the game controller 70 (S168). In the game controller 70, in the credit data update and display process (S164), the credit amount and the monetary amount (including the currency unit) displayed (i.e., assigned) on each of the display devices of the control panel 30 are stored, functions assigned to each of the buttons 34 to 38, 40 to 44 provided to each of the display devices are stored, and based on the operation information of the control panel 30 (i.e., information indicating the operated button), the bet amount and the corresponding monetary amount can be understood.

In this way, the game controller 70 that has received information from the control panel 30 indicating bet information displays the bet information to a section of the lower image display panel 141 of the slot machine 10 (S69). In this case, the game controller 70, based on the credit data (or currency information) stored in the storage unit, displays monetary bet amounts in the specified currency unit or a currency unit other than the specified currency unit on the lower image display panel 141. Specifically, when the currency unit of the currency inserted into the bill entry 60 is the specified currency unit, bet amounts are displayed in monetary amounts in the specified currency unit, and when the currency unit of the currency inserted into the bill entry 60 is a currency unit other than the specified currency unit, bet amounts are displayed in monetary units in the inserted currency unit.

The game controller 70 is configured to proceed with the game (i.e., receive bets, calculate payouts, etc.) according to the monetary amount expressed in the specific currency unit, and when displaying the monetary amount of a bet in a currency unit other than the specified currency unit on the lower image display panel 141, the game controller 70 obtains the contents of the operation from the function assigned to each button 34 to 38, 40 to 44 stored in the game controller 70 (including the currency unit) and the contents of the operation (i.e., the monetary amount in the currency unit and the amount in the non-current currency unit, and the corresponding credit amounts) based on the bet information (S168) (i.e., the operation information of the button) from the control panel 30, and displays the information corresponding to the operation (according to the currency unit displayed on the display devices 40*a* to 44*a*) on the lower image display panel 141 based on the operation contents. Thus, when the player inputs a bet by operating the control panel 30, the game controller 70 displays the information related to the bet input (i.e., a bet amount, etc. in the currency unit of the inserted currency that is different from the specified currency unit), on a section of the lower image display panel 141 of the slot machine 10.

Note that the game controller 70 can obtain the monetary amount corresponding to the operated button in the specified currency unit based on the tables (i.e., the bet amount tables shown in FIGS. 6B and 6C) for conversions between credit amounts assigned to each of the buttons 34 to 38 and 40 to 44 of the control panel 30, the currency unit, and the specified currency unit, but may calculate the amount based on exchange rate described above with reference to FIG. 6A, for example. In this case, when the game controller 70 receives the operation result (for example, the bet information S168, etc.) of a button from the control panel 30, the game controller 70 obtains the bet amount in the specified currency unit from the information expressed in the specified currency unit (i.e., the monetary amount in the specified currency unit corresponding to one credit) such as the bet amount assigned to each button and the bet amount based on the operation result, and transmits the bet amount as bet information (S170) to the PTS device 700 (S170). In the PTS device 700, this bet amount is converted to a monetary amount in a currency unit other than the specified currency unit with the exchange rate shown in FIG. 6A (S171), and the conversion result, as conversion result information, is transmitted to the game controller 70 (S172). Thus, when the player inputs a bet by operating the control panel 30, the game controller 70 displays the information related to the bet inputted (i.e., a bet amount in the currency unit of the inserted currency that is different from the specified currency unit), on a section of the lower image display panel 141 of the slot machine 10. Incidentally, the PTS device 700, in addition to the bet amount in the currency unit, by calculating the corresponding credit amount and transmitting the number to the game controller 70, the game controller 70 can also display the bet amount with the credit amount on the lower image display panel 141.

With the above configuration, as a result of switching the denomination display (i.e., the switching display of the monetary amount in the currency type of the inserted currency), on the denomination touch icon 201 of the lower image display panel 141 and the display devices 40*a*, 41*a*, 42*a*, 43*a*, 44*a*, 47*a* of the control panel 30, to match with the inserted currency, the player can set the bet amount in a monetary amount of the currency he/she is accustomed to using.

Note that information indicating the currency unit of the inserted currency, information of the monetary amounts displayed on the display devices 40*a*, 41*a*, 42*a*, 43*a*, 44*a*, and information for displaying images can be stored in various storage units such as the storage units of the PTS device 700, the display controller 170, and the game controller 70.

The conversion with the exchange rate may be performed by a device other than the PTS device 700, for example, the game controller 70, the control panel 30, or the like.

(Display of Display Device)

Figure 9:
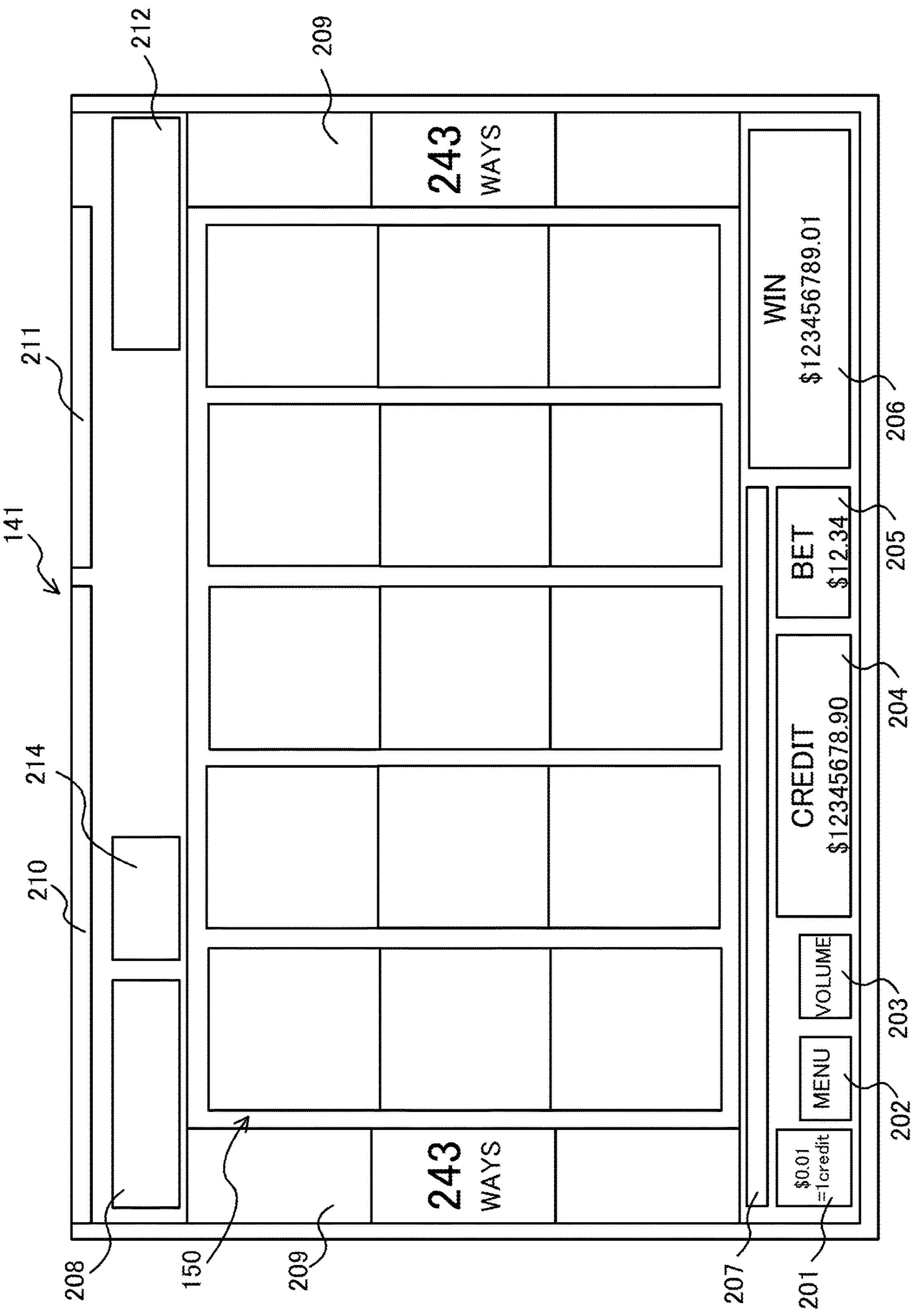
FIG. 9 is a front view showing an example of a display of a lower image display panel.
Figure 10A:
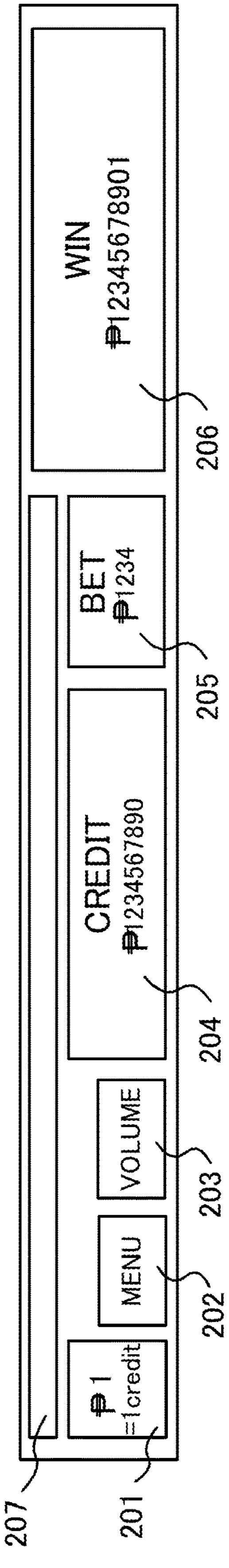
FIG. 10A, FIG. 10B and FIG. 10C are schematic diagrams showing a portion of the display of the lower image display panel.

Information related to currency information and the like shown in FIG. 9 is displayed on the lower image display panel 141 of the slot machine 10.

In addition to the symbol display area 150, the lower image display panel 141 is provided with a denomination touch icon 201, a MENU touch icon 202, a volume touch icon 203, a CREDIT meter 204, a bet meter 205, a win meter 206, a game message display area 207, a free game play counter (FG counter) 208, a WAY number display area 209, an error log indicator area 210, a system message display area 211, a clock display area 212 (including an upper display switching icon), and a stock counter display area 214 at the time of re-triggering.

The denomination touch icon 201 displays a monetary amount (e.g., $0.01) corresponding to one credit in the currency unit of the bill inserted into the bill entry 60 together with a currency symbol (e.g., a symbol indicating "dollars") representing the currency unit of the inserted currency. By touching the denomination touch icon 201, the set monetary amount per credit can be changed. Specifically, when the currency unit of the inserted bill is "dollars", the set monetary amount per credit can be changed to any one of 5 levels in the range of "$0.01" to "$10". Every time the player touches the denomination touch icon 201, an instruction to change the setting to the content of "$0.01", "$0.1", "$1.0", "$5.0", or "$10" is transmitted to the game controller 70, and the content of the setting is changed to the monetary amount per credit in the game controller 70, and the display of the denomination touch icon 201 is changed to the content of the changed setting by the game controller 70. As described above, the game controller 70 can store the currency unit of the inserted bill and display the monetary amount per credit in the currency unit on the denomination touch icon 201. As a result, the player can understand the amount per credit by displaying in the currency unit inserted by the player. When the currency unit of the bill inserted into the bill entry 60 is "pesos", the game controller 70 switches the amount displayed on the denomination touch icon 201 and the symbol representing the currency unit to a notation representing "pesos", for example, as shown, for example, in FIG. 10A. Specifically, the monetary amount in "pesos" per credit is converted in the PTS device 700, and the conversion result is displayed on the denomination touch icon 201 by the game controller 70. In this display, a symbol for the currency unit "pesos", shown by adding two horizontal lines to "P", is added to the display. In this manner, the monetary amount per credit displayed on the denomination touch icon 201 is switched in accordance with the currency unit of the inserted currency.

In the present embodiment, the case has been described in which the switching of the denomination touch icon 201 can be changed to one of 5 levels in the range of "$0.01" to "$10", but the present invention is not limited to this, and the range of the monetary amount and the number of levels can be variably set.

The MENU touch icon 202 is an icon for changing the content (e.g., the display language) to be displayed on the lower image display panel 141 as required. By touching this icon, a pop-up icon for selecting a language is displayed. When the player touches the icon, the selected content is transmitted to the game controller 70, and the game controller 70 displays display characters displayed on the lower image display panel 141 in the selected language. As a result, the player can select and display a desired language display. The selected result is transmitted from the game controller 60 to the display roller 170, whereby the display languages of the display devices 34*a* to 38*a*, 40*a* to 44*a*, and 47*a* of the control panel 30 can be switched to the selected language and displayed.

The volume touch icon 203 is a touch icon for changing the volume of sound or effect sound output from a speaker connected to the game controller 70. Each time this icon is touched, the volume can be selected in a cyclic manner such as small, medium, large, small, and so on.

The CREDIT meter 204 displays the sum total of the monetary amount inserted by the player into the slot machine 10 (i.e., the game controller 70) and the monetary amount awarded to the player as a result of a game in the currency unit of the bill inserted by the player into the bill entry 60. Specifically, when the currency unit of the bill inserted by the player is "dollars", the PTS device 700 transmits the inserted currency information (i.e., the currency unit in "dollars" and the monetary amount thereof) from the bill entry 60 to the game controller 70 together with the specified currency information including the monetary amount in the specified currency unit (e.g., "pesos") and the corresponding credit amount. The game controller 70 receives the information and displays the monetary amount on the CREDIT meter 204 in the currency unit (e.g., "dollars") inserted by the player. In this case, the game controller 70 displays the symbol of the currency unit "dollar" together with the monetary amount based on the information representing the currency unit (e.g., "dollars") of the inserted currency sent from the PTS device 700 (FIG. 9).

When the currency unit of the bill inserted into the bill entry 60 is "pesos", the game controller 70 switches the monetary amount displayed on the CREDIT meter 204 and the symbol representing the currency unit to a symbol representing "pesos", for example, as shown in FIG. 10A. More specifically, the PTS device 700 transmits the inserted currency information (i.e., the currency unit represented by "pesos" and the monetary amount thereof), transmitted from the bill entry 60, to the game controller 70 as specified currency information including the credit amount corresponding to the inserted currency information. The game controller 70 that receives the inserted currency information displays the monetary amount on the CREDIT meter 204 in the currency unit "pesos" inserted by the player. For example, a symbol representing the currency unit "pesos", shown by adding two horizontal lines to "P", is added to the display. In this manner, the monetary amount displayed on the CREDIT meter 204 is switched in accordance with the currency unit of the inserted currency.

Figure 10B:
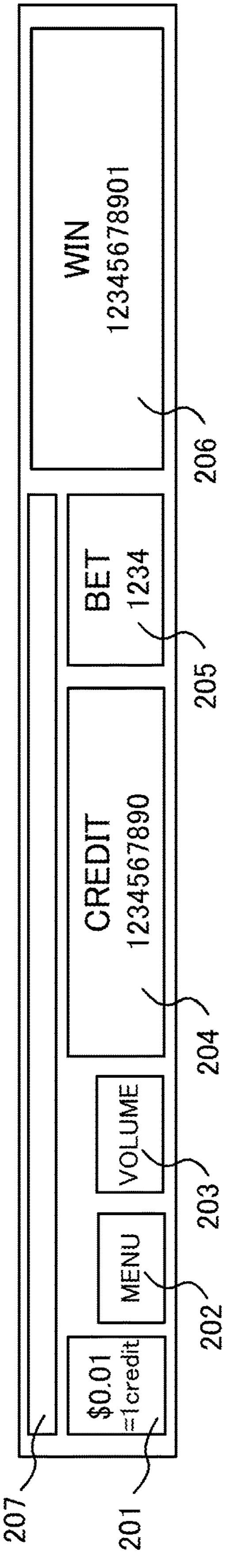

The player can bet on the games from the monetary amount displayed on the CREDIT meter 204. For instance, the display example shown in FIG. 9 and FIG. 10A shows a case in which the display is in a currency unit inserted by the player, but in the present embodiment, the CREDIT meter 204 is configured by a touch icon, and the player can switch the monetary amount display shown in FIG. 9 to a display with the credit amount as shown in FIG. 10B, for example, by touching the CREDIT meter 204. The display in terms of credit amount is a result obtained by converting the currency unit inserted by the player into the credit amount according to the rate at that time. Specifically, when the currency unit of the bill inserted by the player is "dollars", the game controller 70 can display the inserted currency information transmitted from the PTS device 700 and the credit amount converted from the inserted amount (for example, the credit amount corresponding to 1 php=1 credit when "dollars" is converted to "pesos") on the CREDIT meter 204 based on the result of conversion of the inserted currency information to the specified currency unit (e.g., "pesos") and the specified currency information including the credit amount corresponding thereto.

Figure 10C:
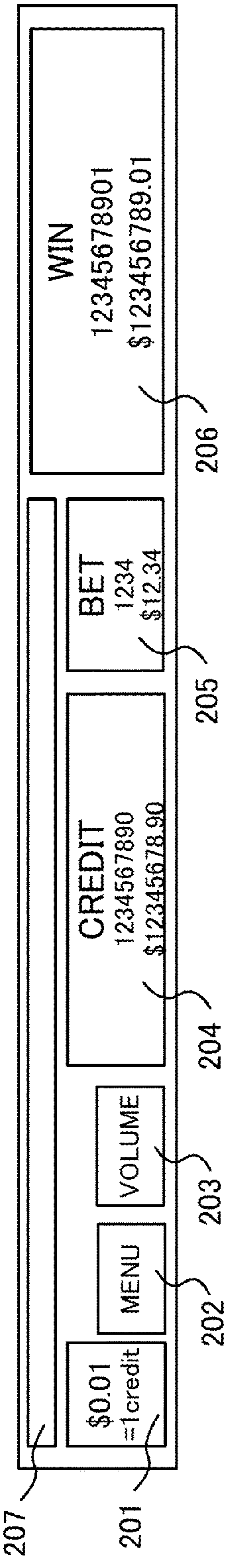

Further, by touching the CREDIT meter 204, the game controller 70 may be switched to display both the monetary amount expressed in the currency unit of the inserted bill and the corresponding credit amount, as shown in FIG. 10C.

The CREDIT meter 204 displays the monetary amount that is subtracted every time the player specifies a bet amount, and also displays the monetary amount that is added every time a payout is awarded as a result of a game.

The BET meter 205 displays the total bet amount for executing the game, which is specified by the player operating the control panel 30. When the player specifies a bet amount by operating the control panel 30, information representing the specified bet amount is transmitted from the control panel 30 to the PTS device 700, and the bet amount, expressed in the currency unit of the inserted currency in the PTS device 700, and the corresponding credit amount are calculated and transmitted from the PTS device 700 to the game controller 70. The game controller 70 which has received these pieces of information displays, selectively, the bet amount specified by the player according to the amount in the inserted currency (e.g., "dollars") (FIG. 9), the credit amount (FIG. 10B), or both (FIG. 10C). The game controller 70 displays the selection when the BET meter 205, having a touch icon configuration, is touched. The game controller 70 adds bet amounts until the player finishes the game and exhausts his/her credits, thereby displaying the bet amount displayed on the BET meter 205 as the total amount until the game is finished and not for each game. The BET meter 205 is updated each time a game is played.

Note that the BET meter 205 shown in FIG. 9 shows a case in which the currency unit of the bill inserted into the bill entry 60 is "dollar", but when the currency unit of the bill inserted into the bill entry 60 is "pesos", the game controller 70 is switched to a notation with a symbol (e.g., a symbol obtained by adding two horizontal lines to "P") representing the monetary amount in "pesos" and the currency unit thereof as shown in FIG. 10A, for example, based on the monetary amount data in the currency unit of "pesos" obtained from the PTS device 700.

The WIN meter 206 displays the amount of the payout (i.e., the prize) to be awarded to the player based on the game results, and when the payout occurs as an execution result, the game controller 70 selectively displays the monetary amount according to the monetary amount of the inserted currency (e.g., "dollars") (see FIG. 9), the credit amount (FIG. 10B), or both thereof (FIG. 10C). This selection is displayed by touching the WIN meter 206 having a touch icon configuration.

Note that the WIN meter 206 shown in FIG. 9 indicates the case where the currency unit of the bill inserted into the bill entry 60 is "dollars", but when the currency unit of the bill input to the bill entry 60 is "pesos", the game controller 70 is switched to the notation by the symbol (e.g., the symbol obtained by adding two horizontal lines to "P") indicating the monetary amount in pesos and the currency unit thereof as shown in FIG. 10A, for example, based on the monetary amount data in the currency unit of pesos obtained from the PTS device 700.

The game message display area 207 displays a description of the game contents and the like in the form of sentences. The free game play counter (FG counter) 208 displays the number of free game plays. The WAY display area 209 displays the type of WAYS BET specified by the player operating the control panel 30 in the form of characters or the like. The error log indicator area 210 is an area for an error log indicator related to the execution of the game. The system message display area 211 is an area for displaying various messages such as payment, ticket history, communication information, and the like. The upper display switching button 212 is a touch-icon area for switching the display content of the upper image display panel 131. The stock counter 214 at the time of re-triggering indicates the number of remaining features at the time of re-triggering.

Other Embodiments

In the embodiment described above, a case where a bill is used as a gaming medium (i.e., paper stock) has been described, but the present invention is not limited to this, and, for example, coins, medals, tokens, tickets with bar codes, and the like can be applied in addition to electronic value information such as cyber money. Further, the currency unit is not limited to "pesos" or "dollars", and a variety of currency units are permissible.

In the embodiment described above, a case where the conversion between the currency unit of the inserted bill and the specified currency unit set in the slot machine 10 is performed in the PTS device 700 has been described, but the conversion is not limited to this, and may be performed in another device such as the game controller 70, for example.

In the embodiment described above, the present invention is applied to the slot machine 10, but the present invention is not limited to this, and can be widely applied to other gaming machines as well as other machines such as vending machines for beverages and the like. When the present invention is applied to a vending machine for beverages or the like, when a user inserts currency of a currency unit other than the specified currency unit into the vending machine, the control unit of the vending machine converts the inserted currency into the specified currency unit and then executes a selling process in the specified currency unit. The sales process refers to a process of deducting the price of a commodity specified by the player by operating the push buttons or the like from the monetary amount inserted and paying out the remaining amount as change. In this case, the control unit displays not the specified currency unit for which the sales process has been performed, but the result of converting from the specified currency unit to the currency unit which the user has inserted so that the user can see the display in his/her familiar currency unit and can easily understand the amount.

In the embodiment described above, the display control of the credit data (i.e., data such as the bet amount, the credit amount inserted by the player, etc.) on the control panel 30 or the lower image display panel 141 is performed by the game controller 70, but the present invention is not limited to this, and for example, the PTS device 700 or the like may perform the display control.

Thus, it is seen that the objects of the present invention are efficiently obtained, although it should be readily apparent to those having ordinary skill in the art that changes and modifications can be made to the invention without departing from the spirit and scope of the invention as claimed. Hence, it should be appreciated that variations of the information processing apparatus may be made, used and sold, and yet be within the spirit and scope of the claims.

Thus, it is seen that the objects of the present invention are efficiently obtained, although modifications and changes to the invention should be readily apparent to those having ordinary skill in the art, and these modifications are intended to be within the spirit and scope of the invention as claimed.

PARTS LIST

10 Slot machine
30 Control panel
60 Bill entry
70 Game controller
141 Lower image display panel
170 Display controller
700 PTS device

What is claimed is:

1. An information processing apparatus, comprising:

a receiving device that receives a gaming medium having currency information that includes a currency unit from a user, and a first display device that displays a currency amount, being equivalent of one credit of a credit amount necessary for starting a process, and a currency unit of the currency amount, based on the currency information of the received gaming medium;

a storage device that stores a plurality of bet amount tables which correspond to a plurality of types of currency unit, respectively;

an input device including a plurality of bet buttons that determine a plurality of payout ratio, respectively, and a plurality of credit buttons that have a plurality of basic bet amounts, respectively, display a plurality of different bet amounts, respectively, and are used to input the credit amount, each of the credit buttons including a second display device;

a control device that converts the currency amount corresponding to the credit amount inputted by the input device to a specified currency amount including a specified currency unit, and moves the process forward using the specified currency amount; and a third display device that displays a monetary amount according to the process in the currency unit indicated by the currency information of the received gaming medium, wherein the second display device included in each of the credit buttons displays a bet amount to be used for a bet by referring to a bet amount table which corresponds to the currency unit based on the currency information of the received gaming medium among the bet amount tables, wherein when the currency information of the received gaming medium indicates a first currency unit, the currency amount is calculated and displayed in the first currency unit, and the second display device included in each of the credit buttons displays the bet amount to be used for the bet in the first currency unit before the user performs the bet to determine the credit amount, wherein when the currency information of the received gaming medium indicates a second currency unit different from the first currency unit, the currency amount is calculated and displayed in the second currency unit, and the second display device included in each of the credit buttons displays the bet amount to be used for the bet in the second currency unit before the user performs the bet to determine the credit amount, wherein the credit amount is determined by the bet amount displayed in the second display device of the at least one credit button that is selected from among the plurality of credit buttons, and wherein the bet amount displayed by the second display device included in each of the plurality of credit buttons is determined by multiplying its basic bet amount among the plurality of basic bet amounts by a payout ratio determined by a bet button selected from among the plurality of bet buttons.

2. The information processing apparatus according to claim 1, comprising: a changing device capable of changing the currency amount per credit, wherein the control device performs conversion to specified currency information based on the currency amount changed by the changing device.

3. The information processing apparatus according to claim 1, wherein the first display device displays the currency amount on an icon, and wherein when the gaming medium indicates a different type, the first display device switches the currency amount displayed on the icon into a currency amount obtained by converting the amount being equivalent of the one credit into an amount expressed in a currency unit determined based on currency information corresponding to the different type.

4. The information processing apparatus according to claim 3, wherein when the icon is touched, a monetary amount per credit is changed.

5. The information processing apparatus according to claim 1, wherein the third display device displays a win meter that displays a monetary amount awarded to the user as a result of a game in the currency unit determined based on the currency information.

6. The information processing apparatus according to claim 5, wherein when the win meter is touched, the third display device switches, on the win meter, the monetary amount displayed in the currency unit into a credit amount corresponding to the monetary amount, or the monetary amount displayed in the currency unit into both the monetary amount and the credit amount corresponding to the monetary amount.

7. The information processing apparatus according to claim 1, wherein the third display device displays a credit meter that displays a sum of a monetary amount inserted by the user and a monetary amount awarded to the user as a result of a game in the currency unit determined based on the currency information.

8. The information processing apparatus according to claim 7, wherein when the credit meter is touched, the third display device switches, on the credit meter, the sum displayed in the currency unit into a credit amount corresponding to the sum, or the sum displayed in the currency unit into both the sum and the credit amount corresponding to the sum.

9. The information processing apparatus according to claim 1, wherein the third display device displays a bet meter that displays a total bet amount for executing a game in the currency unit determined based on the currency information.

10. The information processing apparatus according to claim 9, wherein when the bet meter is touched, the third display device switches, on the bet meter, the total bet amount displayed in the currency unit into a credit amount corresponding to the total bet amount, or the total bet amount displayed in the currency unit into both the total bet amount and the credit amount corresponding to the total bet amount.

11. The information processing apparatus according to claim 1, wherein when the second display device included in each of the bet buttons displays the bet amount in the first currency unit, the second display device included in each of the bet buttons displays a credit corresponding to the bet amount together with the bet amount in the first currency unit, and wherein when second display device included in each of the bet buttons displays the bet amount in the second currency unit, the second display device included in each of the bet buttons displays a credit corresponding to the bet amount together with the bet amount in the second currency unit.

12. An information processing apparatus, comprising:

a receiving device that receives a gaming medium having currency information that includes a currency unit from a player;

a control device that converts a monetary amount awarded to the player as a result of a game to a currency amount in the currency unit determined based on the currency information;

a first display device that displays the currency amount in the currency unit determined based on the currency information;

a storage device that stores a plurality of bet amount tables which correspond to a plurality of types of currency unit, respectively;

an input device including a plurality of bet buttons that determine a plurality of payout ratio, respectively, and a plurality of credit buttons that have a plurality of basic bet amounts, respectively, display a plurality of different bet amounts, respectively, and are used to input the credit amount, each of the credit buttons including a second display device, wherein the control device converts a currency amount corresponding to the credit amount inputted by the input device to a currency amount corresponding to a specified currency unit, and executes the game using the specified currency amount; and a third display device that displays a monetary amount according to a process of the game in the currency unit indicated by the currency information of the received gaming medium, wherein the second display device included in each of the credit buttons displays a bet amount to be used for a bet by referring to a bet amount table which corresponds to the currency unit based on the currency information of the received gaming medium among the bet amount table, wherein when the currency information of the received gaming medium indicates a first currency unit, the currency amount is calculated and displayed in the first currency unit, and the second display device included in each of the credit buttons displays the bet amount to be used for the bet in the first currency unit before the player performs the bet to determine the credit amount, wherein when the currency information of the received gaming medium indicates a second currency unit different from the first currency unit, the currency amount is calculated and displayed in the second currency unit, and the second display device included in each of the credit buttons displays the bet amount to be used for the bet in the second currency unit before the player performs the bet to determine the credit amount, wherein the credit amount is determined by the bet amount displayed in the second display device of the at least one credit button that is selected from among the plurality of credit buttons, and wherein the bet amount displayed by the second display device included in each of the plurality of credit buttons displays is determined by multiplying its basic bet amount among the plurality of basic bet amounts by a payout ratio determined by a bet button selected from among the plurality of bet buttons.

13. The information processing apparatus according to claim 12, comprising a changing device capable of changing a currency amount per credit, wherein the control device performs conversion to specified currency information based on the currency amount changed by the changing device.

14. The information processing apparatus according to claim 12, wherein the third display device displays a win meter, wherein when the win meter is touched, the third display device switches, on the win meter, the currency amount displayed in the currency unit into a credit amount corresponding to the currency amount, or the currency amount displayed in the currency unit into both the currency amount and the credit amount corresponding to the currency amount.

15. An information processing apparatus, comprising:

a receiving device that receives a gaming medium having currency information that includes a currency unit from a player;

a storage device that stores a plurality of tables which correspond to a plurality of types of currency unit, respectively, wherein each of the tables associates an amount represented in a corresponding type of currency unit with a credit that is a common value for a gaming process;

an input device including a plurality of bet buttons that determine a plurality of payout ratio, respectively, and a plurality of credit buttons that have a plurality of basic bet amounts, respectively, display a plurality of different bet amounts, respectively, and are used to input a credit amount to be bet for playing a game, each of the credit buttons including a first display device;

a control device that converts a currency amount corresponding to the credit amount inputted by the input device to a specified currency amount including a specified currency unit, and moves the gaming process forward using the specified currency amount; and a second display device that displays a monetary amount according to the gaming process in the currency unit indicated by the currency information of the received gaming medium, wherein when the currency information of the received gaming medium indicates a first currency unit, the control device provides the credit converted based on a table corresponding to the first currency unit among the tables for the gaming process, and the first display device included in each of the credit buttons displays a bet amount to be used for a bet both in a credit corresponding to the bet amount and in the first currency unit before the player performs the bet to determine the credit amount, wherein when the currency information of the received gaming medium indicates a second currency unit, the control device provides the credit converted based on a table corresponding to the second currency unit among the tables for the gaming process, and the first display device included in each of the credit buttons displays the bet amount to be used for the bet both in the credit corresponding to the bet amount and in the second currency unit before the player performs the bet to determine the credit amount, wherein the credit amount is determined by the bet amount displayed in the first display device of the at least one credit button that is selected from among the plurality of credit buttons, and wherein the bet amount displayed by the first display device included in each of the credit buttons is determined by multiplying its basic bet amount among the plurality of basic bet amounts by a payout ratio determined by a bet button selected from among the plurality of bet buttons.

16. The information processing apparatus according to claim 15, wherein the credit is a value used to execute the gaming process regardless of the plurality of types of currency unit.

17. The information processing apparatus according to claim 15, wherein the second display device that displays the monetary amount both in the currency unit indicated by the currency information of the received gaming medium and in the credit, and displays a total bet amount for executing a game both in the currency unit indicated by the currency information of the received gaming medium and in the credit.

* * * * *